(12) United States Patent
Rios et al.

(10) Patent No.: US 7,625,625 B2
(45) Date of Patent: Dec. 1, 2009

(54) SILICONE COMPOSITIONS, METHODS OF MANUFACTURE, AND ARTICLES FORMED THEREFROM

(75) Inventors: Victor Rios, Chicago, IL (US); Robert C. Daigle, Amston, CT (US); Daniel J. Kubick, Bartlett, IL (US); Walter J. Paciorek, Phoenix, AZ (US); Karen Phifer, Oak Park, IL (US); Dave Sherman, Ashford, CT (US); Scott S. Simpson, Woodstock, CT (US)

(73) Assignee: World Properties, Inc., Lincolnwood, IL (US)

( * ) Notice: Subject to any disclaimer, the term of this patent is extended or adjusted under 35 U.S.C. 154(b) by 202 days.

(21) Appl. No.: 11/497,809

(22) Filed: Aug. 2, 2006

(65) Prior Publication Data

US 2007/0148409 A1 Jun. 28, 2007

Related U.S. Application Data

(60) Provisional application No. 60/704,640, filed on Aug. 2, 2005, provisional application No. 60/704,982, filed on Aug. 3, 2005.

(51) Int. Cl.
C08L 83/04 (2006.01)
B29C 65/00 (2006.01)

(52) U.S. Cl. .................. 428/141; 428/343; 156/60; 528/32

(58) Field of Classification Search ............... 428/847.3
See application file for complete search history.

(56) References Cited

U.S. PATENT DOCUMENTS

| 1,352,733 A | 9/1920 | Egerton |
| 2,285,335 A | 6/1942 | Hurt |
| 2,940,887 A | 6/1960 | Daly et al |
| 3,182,005 A | 5/1965 | Lupfer |
| 3,519,527 A | 7/1970 | Crowley |

(Continued)

FOREIGN PATENT DOCUMENTS

EP 0532273 A1 3/1993

(Continued)

OTHER PUBLICATIONS

Butts, Silicones, Apr. 15, 2003, Encyclopedia of Polymewr Science and Technology, Wiley & Sons Inc., pp. 765-841.*

(Continued)

*Primary Examiner*—Jennifer McNeil
*Assistant Examiner*—Adam C Krupicka
(74) *Attorney, Agent, or Firm*—Cantor Colburn, LLP

(57) ABSTRACT

A silicone grip comprising a cured silicone film layer with a Shore A Durometer of less than or equal to about 60 wherein the silicone film layer is formed from a curable silicone composition comprising a catalyst that promotes cure of the silicone composition, a higher molecular weight organopolysiloxane having at least two alkenyl groups per molecule, a lower molecular weight organopolysiloxane having at least two alkenyl groups per molecule, and an organopolysiloxane having at least two silicon-bonded hydrogen atoms per molecule. The cured silicone layer is used in combination with an adhesive to provide a flexible and malleable grip, and/or in combination with a backing layer that can be solid or foamed.

48 Claims, 4 Drawing Sheets

U.S. PATENT DOCUMENTS

| | | | |
|---|---|---|---|
| 3,583,930 A | | 6/1971 | Ehrreich et al |
| 3,895,153 A | | 7/1975 | Johnston et al. |
| 3,914,487 A | | 10/1975 | Azoulay |
| 4,011,360 A | | 3/1977 | Walsh |
| 4,018,957 A | | 4/1977 | Werner et al. |
| 4,137,356 A | | 1/1979 | Shoemaker et al. |
| 4,279,783 A | | 7/1981 | Kehrer et al. |
| 4,310,509 A | * | 1/1982 | Berglund et al. ............ 424/448 |
| 4,411,943 A | | 10/1983 | Akao |
| 4,504,549 A | * | 3/1985 | Pines et al. ................ 428/447 |
| 4,552,688 A | | 11/1985 | Sakamoto et al. |
| 4,552,713 A | | 11/1985 | Cavicchioli |
| 4,568,566 A | * | 2/1986 | Tolentino ................... 427/515 |
| 4,709,688 A | | 12/1987 | Paradis |
| 4,740,440 A | | 4/1988 | Honda et al. |
| 4,845,778 A | | 7/1989 | Peterson |
| 4,898,689 A | | 2/1990 | Hamada et al. |
| 4,904,248 A | | 2/1990 | Vaillancourt |
| 4,929,669 A | | 5/1990 | Jensen |
| 5,075,038 A | | 12/1991 | Cole et al. |
| 5,182,050 A | | 1/1993 | Joyce, Jr. et al. |
| 5,300,171 A | | 4/1994 | Braun et al. |
| 5,348,686 A | | 9/1994 | Vyas |
| 5,366,664 A | | 11/1994 | Varadan et al. |
| 5,384,075 A | | 1/1995 | Okami |
| 5,498,644 A | | 3/1996 | Reo |
| 5,510,164 A | | 4/1996 | Best et al. |
| 5,639,989 A | | 6/1997 | Higgins, III |
| 5,910,524 A | | 6/1999 | Kalinoski |
| 5,928,569 A | | 7/1999 | Reo |
| 5,928,570 A | | 7/1999 | Reo |
| 5,932,145 A | | 8/1999 | Mitani et al. |
| 5,948,707 A | | 9/1999 | Crawley et al. |
| 6,017,587 A | | 1/2000 | Kleyer et al. |
| 6,365,280 B1 | | 4/2002 | Schlueter, Jr. et al. |
| 6,372,323 B1 | | 4/2002 | Kobe et al. |
| 6,416,604 B1 | * | 7/2002 | Nootbaar et al. ............ 156/157 |
| 6,469,090 B1 | | 10/2002 | Azechi et al. |
| 6,673,409 B1 | | 1/2004 | Wheatley |
| 6,783,692 B2 | * | 8/2004 | Bhagwagar .................. 252/70 |
| 2001/0039323 A1 | | 11/2001 | Achenbach et al. |
| 2003/0064579 A1 | | 4/2003 | Miyakawa et al. |
| 2003/0211900 A1 | * | 11/2003 | Novak et al. ................. 473/300 |
| 2003/0232900 A1 | * | 12/2003 | Irifune ......................... 522/6 |

FOREIGN PATENT DOCUMENTS

| | | |
|---|---|---|
| EP | 0399794 A2 | 3/1995 |
| EP | 0653463 A2 | 5/1995 |
| EP | 0803542 A2 | 10/1997 |
| EP | 0839870 A2 | 5/1998 |
| EP | 0971367 A1 | 1/2000 |
| EP | 1359007 A1 | 8/2000 |
| EP | 0791477 A2 | 6/2001 |
| JP | 2002138126 A | 5/2002 |
| JP | 2003317419 A2 | 11/2003 |
| JP | 2005099518 A2 | 4/2005 |
| JP | 2006134446 A2 | 5/2006 |
| WO | 0020210 | 4/2000 |
| WO | 2004050343 A1 | 6/2004 |
| WO | 2005026434 A1 | 3/2005 |

OTHER PUBLICATIONS

International Search Report for International Application No. PCT/US2006/030061, Mailed May 21, 2007, 2 pages.

Written Opinion for International Application No. PCT/US2006/030061, Mailed May 21, 2007, 6 pages.

* cited by examiner

SILICONE COMPOSITIONS, METHODS OF MANUFACTURE, AND ARTICLES FORMED THEREFROM

CROSS-REFERENCE TO RELATED APPLICATIONS

This application claims the benefit of U.S. Provisional Application Ser. No. 60/704,640 filed Aug. 2, 2005 and to U.S. Provisional Application Ser. No. 60/704,982 filed Aug. 3, 2005, both of which are incorporated herein by reference in their entirety.

BACKGROUND

This invention relates to high-friction, cured silicone compositions, methods for their manufacture, and methods for their use, including articles formed therefrom having a gripping surface.

Hand-held articles desirably have a surface that can be securely gripped to prevent slipping or dropping of the article under a variety of conditions such as wet, dry, or in the presence of particulates such as sand, dirt, or lubricating powder. Making the surface soft can enhance grip, and is preferred for lightweight plastic components, but it can also adversely affect the durability of the gripping surface. It has heretofore been difficult to achieve a balance between the properties required for enhanced grip, for example softness and high coefficient of friction, and the mechanical properties required for durability.

Thick silicone sheets having a thickness of greater than 2.5 mm and sufficient softness (e.g., Shore A Durometer of less than about 60) can provide a suitable surface for gripping and sufficient durability. However, when the silicone in the form of a thin sheet (less than or equal to 2.5 mm thickness) it is more prone to tearing. A reinforcing backing can be used to reinforce the layer, but to be effective the adhesion of the silicone layer to the backing layer must be sufficient to prevent separation. This can be difficult to achieve under conditions of repeated stress. An adhesive can be used between the silicone layer and the backing, but effective adhesives can degrade the silicone over time. Moreover, silicone adhesives are expensive and non-silicone adhesives do not stick effectively to thin silicone elastomers.

Accordingly, there remains a need in the art for a gripping surface comprising a cured silicone having a durometer and a coefficient of friction effective to provide a good gripping surface, as well as enhanced adhesion to a variety of substrates, optionally with the use of an adhesive for adhesion to articles benefiting from improved grip. It would be a further advantage if the cured silicone could be durable when used at thickness of less than or equal to 2.5 mm.

BRIEF SUMMARY

The above-described drawbacks and disadvantages are alleviated by a silicone grip comprising a cured silicone film layer with a Shore A Durometer of less than or equal to about 60 and having an exterior surface and an opposite, interior surface; and an adhesive layer disposed on and in contact with the interior surface, wherein the silicone film layer is formed from a curable silicone composition comprising a catalyst that promotes cure of the silicone composition, a higher molecular weight organopolysiloxane having at least two alkenyl groups per molecule, a lower molecular weight organopolysiloxane having at least two alkenyl groups per molecule, and an organopolysiloxane having at least two silicon-bonded hydrogen atoms per molecule, wherein the reaction of the higher molecular weight organopolysiloxane having at least two alkenyl groups per molecule with the organopolysiloxane having at least two silicon-bonded hydrogen atoms per molecule produces a cured silicone having a Shore A Durometer of 30 to 60, and wherein reaction of the lower molecular weight organopolysiloxane having at least two alkenyl groups per molecule with the organopolysiloxane having at least two silicon-bonded hydrogen atoms per molecule produces a cured silicone having a Shore OO Durometer of 20 to 60.

A method of manufacture of a silicone grip comprises contacting a layer of the above-described curable silicone composition with a layer of an adhesive; and curing the curable silicone composition. The adhesive layer can be disposed on a release layer.

In another embodiment, an article comprises the above described silicone grip adhered to a surface of the article via the adhesive layer.

A method of manufacture of an article comprises attaching the silicone grip as described above to a surface of an article via the adhesive layer.

In still another embodiment, the silicone grip is in the form of a multilayer film comprising the above-described cured silicone film layer having an interior surface and an exterior surface; a backing layer having a first surface and a second, opposite surface, wherein the interior surface of the cured silicone layer is disposed on and in contact with the first surface of the backing layer, and further wherein the adhesion between the silicone film layer and the backing layer is greater than 1,000 grams of force per 25 millimeters, as determined by a 180° pull peel test measured according to ASTM D903; and, optionally, an adhesive layer disposed on the second surface of the backing layer. An optional release layer can be disposed on a side of the adhesive layer opposite the backing layer.

A method of forming a multilayer film comprises contacting the above-described curable silicone composition with the first surface of the backing layer; and curing the curable silicone composition to provide the multilayer film. An adhesive layer and optional release layer can be disposed on the second surface of the backing layer before or after the curable silicone composition is applied and cured.

An article comprises the above-described multilayer film, wherein the second surface of the backing layer is adhered to a surface of the article by an adhesive.

A method of manufacture of an article comprises adhering the above described multilayer silicon grip to a surface of the article by an adhesive layer disposed on the second surface of the backing layer.

The above discussed and other features and advantages of the present invention will be appreciated and understood by those skilled in the art from the following figures and detailed description.

DRAWINGS AND FIGURES

DETAILED DESCRIPTION

Figure 1:
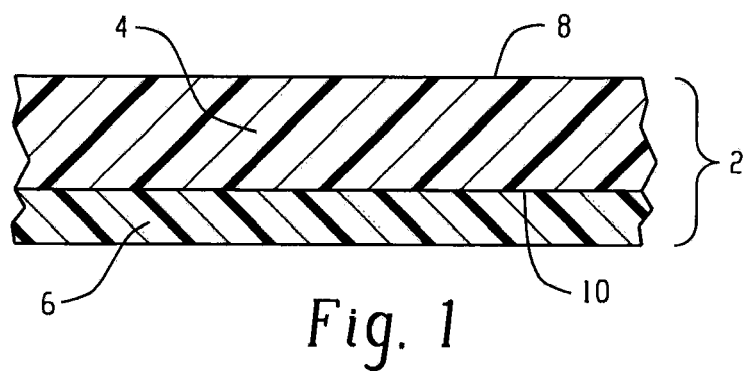
FIG. 1 is a partial and cross-sectional view of one embodiment of a silicone grip comprising a silicone layer and an adhesive layer.

Disclosed herein are soft silicone grips that can provide excellent anti-slip properties to handheld articles, without compromising the durability of the silicone layer. The surface grips comprise a cured silicone film layer formed from a curable silicone composition. The silicone film layers have a Shore A durometer of less than or equal to 60 and a high coefficient of friction under a variety of conditions, including when wet. Even in the form of thin films, the silicone film layers are also durable, standing up to repeated use. The grips can be in the form of a silicone film layer and an adhesive layer; or in the form of a multilayer film comprising the silicone film layer disposed on and in direct contact with a backing layer. Other adhesive and/or backing layers can also be present to provide additional functionality, such as compressibility, adhesion to an article, conformability, and the like.

The advantageous properties of the silicone layer, in particular the combination of softness and durability, are provided by use of a specific combination of components, in particular a higher molecular weight alkenyl-substituted polyorganosiloxane, a lower molecular weight vinyl-substituted polyorganosiloxane, and a hydride-substituted polyorganosiloxane as described in greater detail below. Improved adhesion to a backing layer can be provided by inclusion of an optional reactive organosiloxane, that is, an organopolysiloxane having a reactive group such as acrylate, methacrylate, and/or epoxy groups. Use of an optional, low viscosity, non-volatile organopolysiloxane fluid can allow further adjustment of the surface properties and texture that also allow adjustment of the grip properties. The relative amounts of each component in the curable composition can be adjusted to allow tailoring of filler level and viscosity of the composition, and thus softness and other properties in the cured silicone elastomer.

Suitable organopolysiloxanes having at least two alkenyl groups per molecule are generally represented by the formula:

wherein the subscripts a, b, c, and d are zero or a positive integer, subject to the limitation that if subscripts a and b are both equal to zero, subscript c is greater than or equal to two; M has the formula $R_3SiO_{1/2}$; D has the formula $R_2SiO_{2/2}$; T has the formula $RSiO_{3/2}$; and Q has the formula $SiO_{4/2}$, wherein each R group independently represents hydrogen, terminally-substituted $C_{1-6}$ alkenyl groups, substituted and unsubstituted monovalent hydrocarbon groups having from one to forty, specifically one to six carbon atoms each, subject to the limitation that at least two of the R groups are alkenyl R groups. Suitable alkenyl R-groups are exemplified by vinyl, allyl, 1-butenyl, 1-pentenyl, and 1-hexenyl, with vinyl being particularly useful. The alkenyl group can be bonded at the molecular chain terminals, in pendant positions on the molecular chain, or both.

Other silicon-bonded organic groups in the organopolysiloxane having at least two alkenyl groups, when present, are exemplified by substituted and unsubstituted monovalent hydrocarbon groups having from one to forty carbon atoms. For example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl. Methyl and phenyl are specifically useful.

The alkenyl-containing organopolysiloxane can have straight chain, partially branched straight chain, branched-chain, or network molecular structure, or can be a mixture of such structures. The alkenyl-containing organopolysiloxane is exemplified by trimethylsiloxy-endblocked dimethylsiloxane-methylvinylsiloxane copolymers; trimethylsiloxy-endblocked methylvinylsiloxane-methylphenylsiloxane copolymers; trimethylsiloxy-endblocked dimethylsiloxane-methylvinylsiloxane-methylphenylsiloxane copolymers; dimethylvinylsiloxy-endblocked dimethylpolysiloxanes; dimethylvinylsiloxy-endblocked methylvinylpolysiloxanes; dimethylvinylsiloxy-endblocked methylvinylphenylsiloxanes; dimethylvinylsiloxy-endblocked dimethylvinylsiloxane-methylvinylsiloxane copolymers; dimethylvinylsiloxy-endblocked dimethylsiloxane-methylphenylsiloxane copolymers; dimethylvinylsiloxy-endblocked dimethylsiloxane-diphenylsiloxane copolymers; and mixtures comprising at least one of the foregoing organopolysiloxanes.

A suitable organopolysiloxane having at least two silicon-bonded hydrogen atoms per molecule is generally represented by the formula:

wherein the subscripts a, b, c, and d are zero or a positive integer, subject to the limitation that if subscripts a and b are both equal to zero, subscript c is greater than or equal to two; M' has the formula $R_3SiO_{1/2}$; D' has the formula $R_2SiO_{2/2}$; T' has the formula $RSiO_{3/2}$; and Q' has the formula $SiO_{4/2}$, wherein each R group independently represents hydrogen, substituted and unsubstituted monovalent hydrocarbon groups having from one to forty, specifically one to six carbon atoms each, subject to the limitation that at least two of the R groups are hydrogen. Specifically, each of the R groups of the organopolysiloxane having at least two silicon-bonded hydrogen atoms per molecule are independently selected from hydrogen, methyl, ethyl, propyl, butyl, pentyl, hexyl, aryl, phenyl, tolyl, xylyl, aralkyl, benzyl, phenethyl, halogenated alkyl, 3-chloropropyl, 3,3,3-trifluoropropyl, and combinations comprising at least one of the foregoing. Methyl and phenyl are specifically preferred.

The hydrogen can be bonded to silicon at the molecular chain terminals, in pendant positions on the molecular chain, or both. In one embodiment, the hydrogens are substituted at terminal positions. In another embodiment, at least 3 to 4 hydrogens are present per molecule. The hydrogen-containing organopolysiloxane component can have straight chain, partially branched straight chain, branched-chain, cyclic, or network molecular structure, or can be a mixture of two or more selections from organopolysiloxanes with the exemplified molecular structures.

The hydrogen-containing organopolysiloxane is exemplified by trimethylsiloxy-endblocked methylhydrogenpolysiloxanes; trimethylsiloxy-endblocked dimethylsiloxane-methylhydrogensiloxane copolymers; trimethylsiloxy-endblocked methylhydrogensiloxane-methylphenylsiloxane copolymers; trimethylsiloxy-endblocked dimethylsiloxane-methylhydrogensiloxane-methylphenylsiloxane copolymers; dimethylhydrogensiloxy-endblocked dimethylpolysiloxanes; dimethylhydrogensiloxy-endblocked methylhydrogenpolysiloxanes; dimethylhydrogensiloxy-endblocked dimethylsiloxanes-methylhydrogensiloxane copolymers; dimethylhydrogensiloxy-endblocked dimethylsiloxane-methylphenylsiloxane copolymers; and dimethylhydrogensiloxy-endblocked methylphenylpolysiloxanes.

The curable silicone composition comprises a combination of at least two of the above-described alkenyl-substituted polyorganosiloxanes, one having a higher molecular weight and one having a lower molecular weight. The relative amount of each compound will depend on its particular molecular weight, and can therefore vary widely; similarly, the molecular weight of each compound can vary, depending on the amount of the compound as well as the desired characteristics of the cured silicone. In general, a suitable higher molecular weight compound, when reacted with the hydride-substituted polyorganosiloxane, will provide a cured silicone having a Shore A Hardness of 30 to 60. A suitable lower molecular weight compound, when reacted with the hydride-substituted polyorganosiloxane, will provide a cured silicone having a Shore OO Hardness of 20 to 60. The lower molecular weight component(s) allow for a reduced overall viscosity of the mixture providing for easy of casting, coating, spreading, and various methods of texturing including casting onto a textured carrier.

The hydride-containing organopolysiloxane component is used in an amount sufficient to cure the composition, specifically in a quantity that provides from about 1.0 to about 10 silicon-bonded hydrogen atoms per alkenyl group in the alkenyl-containing organopolysiloxane component. When the number of silicon-bonded hydrogen atoms per alkenyl group exceeds 10, gas bubbles can be produced during cure and the heat resistance of the resulting cured silicone can progressively decline.

Since a wide variety of two-part curable silicone compositions are commercially available, one convenient method for the formulation of the curable silicone composition is to combine two different commercially available two-part curable silicone compositions, each containing an alkenyl-containing component and a hydride-containing component. A suitable first curable composition provides a cured silicone having a Shore A Hardness of 30-60. Exemplary curable silicone compositions of this type include, for example, that available under the trade name LIM 6040-D2 from GE Silicones, Pittsfield, Mass.

A suitable second curable composition provides a cured silicone having a Shore OO Hardness of 20 to 60. Such systems form a "gel," i.e., a lightly-to-extensively cross-linked fluid or under-cured elastomer. Gels are unique in that they range from very soft and tacky (for a soft gel) to moderately soft and only slightly sticky to the touch (for a firm gel), to a hardened surface with little or no tackiness (for a toughened gel). Use of a gel formulation allows at least one of improved flowability for casting or molding, improved compatibility with any filler present, and improved control of the cure process. Such compositions can have an improved balance of durability and increased softness for better surface tackiness and/or grip. The components of two-part curable gel formulations are similar to that described above (i.e., an organopolysiloxane having at least two alkenyl groups per molecule and an organopolysiloxane having at least two silicon-bonded hydrogen atoms per molecule). The main difference lies in the fact that alkenyl substituted organopolysiloxanes are of lower molecular weight, and the molar ratio of the silicon bonded hydrogen groups (Si—H) groups to the alkenyl groups is usually less than one, and is varied to create a "under-cross linked" polymer with the looseness and softness of a cured gel. The ratio of silicone-bonded hydrogen atoms to alkenyl groups can be less than 1.0, less than about 0.75, less than about 0.6, or less than about 0.1. Examples of suitable commercial organopolysiloxane gel formulations include that available under the trade names 3-4237 Dielectric Gel and 3-4241 Dielectric Tough Gel from Dow Corning Corp., Midland, Mich. In another embodiment, the gel formulation can be a one-part formulation wherein the partially cured gel co-cures with the two-part higher molecular weight system.

When two (or more) two-part compositions are used to formulate the curable silicone, the relative amount of each composition will depend on the type and amount of each component, as well as the desired characteristics of the cure silicone. In general, the curable silicone composition can comprise about 30 to about 70, specifically about 40 to about 60 weight percent of the first curable silicone composition, and about 30 to about 70, specifically about 40 to about 60 weight percent of the second silicone composition based on the total weight of the curable silicone composition, exclusive of any filler.

The curable silicone composition can further comprise a reactive organopolysiloxane, that is, an organopolysiloxane having a reactive group different from an alkenyl group or a reactive Si—H group, and can be covalently bound to the organopolysiloxane. Without being bound by theory, it is hypothesized that the reactive organopolysiloxane enhances binding of the cured silicone layer, particularly to the backing layer. In this embodiment, the reactive organosiloxane can be represented by the formula:

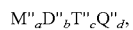

wherein the subscripts a, b, c, and d are zero or a positive integer, subject to the limitation that if subscripts a and b are both equal to zero, subscript c is greater than or equal to two; M" has the formula $R_3SiO_{1/2}$; D" has the formula $R_2SiO_{2/2}$; T" has the formula $RSiO_{3/2}$; and Q" has the formula $SiO_{4/2}$, wherein each R group independently represents hydrogen, alkenyl groups, substituted and unsubstituted monovalent hydrocarbon groups having from one to forty, specifically one to ten carbon atoms each, subject to the limitation that, in addition to any alkenyl groups and/or reactive hydride groups present in the silicone, one or more of the R groups is a reactive organic group. Suitable reactive groups include, for example, acrylates, methacrylates, and epoxy groups.

Polyorganosiloxanes containing such reactive groups can be derived by the reaction of a trialkoxysilane monomer containing the reactive group during synthesis of the organopolysiloxane containing the reactive group. Alternatively, the reactive group can be provided as a separate component (e.g., in the form of a trialkoxysilane monomer) in admixture with a two-part system as described above. Dialkoxy alkylsilane and alkoxy dialkylsilane monomers containing the reactive groups can alternatively be used. The alkoxy and/or alkyl groups in the foregoing monomers can have 1 to 10, specifically 1 to 6, more specifically 1 to 3 carbon atoms. One suitable alkoxysilane monomer is an epoxy silane represented by the formula (1):

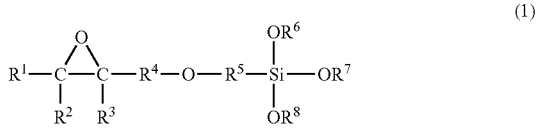

wherein $R^1$, $R^2$, and $R^3$ are independently hydrogen or $C_{1-10}$ hydrocarbon groups; $R^4$ and $R^5$ are independently $C_{1-10}$ alkylene or $C_{1-10}$ alkylidene groups; and $R^6$, $R^7$, and $R^8$ are independently $C_{1-10}$ hydrocarbon groups. The hydrocarbon groups specifically contain 1 to about 6 carbon atoms, more specifically 1 to about 4 carbon atoms. These hydrocarbon groups are specifically alkyl. The alkylene or alkylidene groups $R^4$ and $R^5$ specifically contain 1 to about 6 carbon atoms, more specifically 1 to about 4 carbon atoms, more specifically 1 or 2 carbon atoms. The alkylene and alkylidene groups can be methylene, ethylene, propylene, and the like.

The alkoxysilane monomer can also be a (meth)acrylic silane represented by the formula (2):

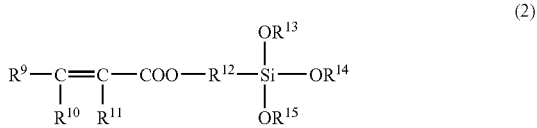

wherein $R^9$, $R^{10}$, and $R^{11}$ are independently hydrogen or $C_{1-10}$ hydrocarbon groups; $R^{12}$ is a $C_{1-10}$ alkylene or $C_{2-10}$ alkylidene group; and $R^{13}$, $R^{14}$ and $R^{15}$ are independently $C_{1-10}$ hydrocarbon groups. The hydrocarbon groups specifically contain 1 to about 6 carbon atoms, more specifically 1 to about 4 carbon atoms. These hydrocarbon groups are specifically alkyl (e.g., methyl, ethyl, propyl, and the like). The alkylene and alkylidene groups specifically contain 1 to about 6 carbon atoms, more specifically 1 to about 4 carbon atoms. The alkylene groups include methylene, ethylene, propylene, and the like.

In a specific embodiment, the reactive groups can be derived from glycidoxypropyl tri($C_{1-3}$alkoxy)silane, glycidoxypropyl di($C_{1-3}$alkoxy) ($C_{1-3}$alkyl)silane, 2,3-epoxycyclohexyl-4-ethyl tri($C_{1-3}$alkoxy)silane, 2,3-epoxycyclohexyl-4-ethoxyethyl di($C_{1-3}$alkoxy)($C_{1-3}$alkyl)silane, or a combination comprising at least one of the foregoing silane monomers. The reactive group can be bonded at the molecular chain terminals of the organopolysiloxane, in pendant positions on the molecular chain, or both. In another specific embodiment, the reactive group is provided by combining one or more of the foregoing monomers with the curable compositions. An example of a commercial curable composition that comprises a suitable reactive organosiloxane is available under the trade name 3-4237 Dielectric Firm Gel from Dow Corning Corporation.

The reactive organosiloxane comprises reactive groups on a molar basis per mole of silicon-containing monomeric unit of about 0.1 to about 50 mole-percent (mol %), specifically about 0.5 to about 45 mol %, more specifically about 1 to about 40 mol %, and still more specifically about 2 to about 40 mol %, based on 100 mol % of silicon-containing monomeric units in the organosiloxane of the reactive organosiloxane.

The amount of reactive organosiloxane in the curable silicone composition can vary widely depending on the reactive group and the desired properties of the elastomer. For example, the curable silicone composition can comprise the about 0.05 to about 50 weight percent (wt %), specifically about 0.1 to about 45 wt %, more specifically about 0.5 to about 40 wt %, and still more specifically about 1 to about 40 wt % reactive organosiloxane based on the total weight of the curable silicone composition, exclusive of any filler.

The curable silicone composition can further comprise a silicone fluid (also referred to as an organopolysiloxane fluid), to adjust the viscosity of the curable silicone composition and/or to provide specific properties to the cured product, such as softness. Suitable organopolysiloxane fluids have a viscosity of less than about 1,000 cP, specifically less than about 750 cP, more specifically less than about 600 cP, and most specifically less than about 500 cP. Such organopolysiloxane fluids decrease the viscosity of the composition, thereby allowing, where desired, at least one of increased filler loading, enhanced filler wetting, and enhanced filler distribution, and improved molding and/or coating and casting properties. The organopolysiloxane fluid specifically does not substantially inhibit the curing reaction, i.e., the addition reaction, of the composition but it can or cannot participate in the curing reaction.

The silicone fluid can be non-reactive or can co-cure with the other organosiloxane components. The boiling point of a suitable non-reactive silicone fluid is high enough such that it is dispersed in the polymer matrix, does not evaporate during or after cure, and does not migrate to the surface or outgas. It is further selected to lead to low outgassing and little or no migration to the surface during use of the cured silicone layer. A suitable non-reactive organosiloxane fluid has a boiling point greater than or equal to about 260° C. (500° F.), and can be branched or straight-chained. Examples of non-reactive organosiloxane fluids include DC 200 from Dow Corning Corporation.

Where the silicone fluid is co-curable, the silicone fluid can become part of the polymer matrix by covalent bonding, thereby minimizing outgassing and/or surface migration. Organopolysiloxane fluids can be co-curing with the alkenyl-containing organopolysiloxane and the organopolysiloxane having at least two silicon-bonded hydrogen atoms, and therefore can themselves contain alkenyl groups or silicon-bonded hydrogen groups. Such compounds can have the same structures as described above in connection with the alkenyl-containing organopolysiloxane and the organopolysiloxane having at least two silicon-bonded hydrogen atoms, but in addition have a viscosity of less than about 1,000 cP, and specifically have a boiling point greater than the curing temperature of the addition cure reaction, i.e., greater than or equal to about 260° C. (500° F.).

The curable silicone composition further comprises, generally as a component of the part containing the organopolysiloxane having at least two alkenyl groups per molecule, a hydrosilylation-reaction catalyst. Effective catalysts promote the addition of silicon-bonded hydrogen onto alkenyl multiple bonds to accelerate cure. Such catalyst can include a noble metal, such as, for example, platinum, rhodium, palladium, ruthenium, iridium, or a combination comprising at least one of the foregoing. The catalyst can also include a support material, specifically activated carbon, aluminum oxide, silicon dioxide, thermoplastic resin, and combinations comprising at least one of the foregoing.

Platinum and platinum-containing compounds are preferred, and include, for example platinum black, platinum-on-alumina powder, platinum-on-silica powder, platinum-on-carbon powder, chloroplatinic acid, alcohol solutions of chloroplatinic acid platinum-olefin complexes, platinum-alkenylsiloxane complexes and the catalysts afforded by the microparticulation of the dispersion of the catalyst in a thermoplastic resin such as methyl methacrylate, polycarbonate, polystyrene, silicone, and the like. Mixtures of catalysts can also be used.

A quantity of catalyst effective to cure the silicone composition is used, which is generally about 0.1 to about 1,000 parts per million by weight (ppm) of metal (e.g., platinum) based on the combined amounts of the reactive organosiloxane components.

A high crosslink density silicone fluid containing hydrogen bonded to silicon can also be used to overcome this problem. It appears that the large number of functional groups helps to improve the cure kinetics without the need for platinum and hence, there is no issue of pot life. When present, a suitable crosslinker concentration is less than or equal to about 0.5% by weight, based on the total weight of the organopolysiloxane mixture. An example of a suitable crosslinker is available under the trade name "1107 Fluid" from Dow Corning Corp.

Other additives can be present in either part of the curable silicone compositions, for example, filler (including reinforcing, decorative, or conductive filler), ultraviolet (UV) stabilizers, antistatic agents, pigments, antimicrobial or antiviral agents, and the like, or a combination comprising at least one of these. Where additives are present, the amounts used are selected so that the desired properties of the cured silicone composition are not adversely affected by the presence of the additives.

Filler, where used, can be added in quantities of about 0.1 to about 90 wt %, based on the total weight of the curable silicone composition, the remainder being the organopolysiloxanes and any other optional additives. A single filler can be used, or a mixture of fillers having various average particle sizes. It is sometimes found in the liquid casting process that as the mixture goes between two rolls of the coater, the use of larger particle size fillers causes pinholes or tears in the elastomer when made in thin cross sections (e.g., less than or equal to about 760 micrometers, 32 mils). Mixing larger size fillers (e.g., those having an average longest dimension of about 90 micrometers) and smaller size fillers (e.g., those having an average longest dimension of about 45 micrometers) can alleviate this problem. Reinforcing fillers, typically fumed silica, can be present in one or both parts, in amounts of about 10 to about 30% by weight of each part.

In order to allow the addition, incorporation, and wetting of any filler, the viscosity of the combined components of the curable silicone composition (excluding filler) is less than about 100,000 cP, specifically less than about 50,000 cP, and most specifically less than about 35,000 cP. Alternatively, or in addition, the combined components of the curable silicone composition (excluding filler) have a neat extrusion rate of less than about 500 g/minute measured according to ASTM C-603-98.

The curable silicone composition can have a pot life of several minutes to over a week, depending on the composition and method of cure used. As used herein, the term "pot life" means the amount of time that can transpire from the time the curing process is initiated (e.g., by combining co-curable components in the presence of a catalyst) to the time wherein the cure has advanced to the point where desirable properties of flow and/or workability are no longer in a useful range for the manufacturing process, to provide a suitable product. Properties affected by the pot life of the silicone composition include, for example, extrudability, flow, coat quality, coat uniformity, coating thickness, and number of defects. The pot life is typically assessed at room temperature, and can be, in an embodiment, greater than or equal to about 4 hours, specifically greater than or equal to about 6 hours, more specifically greater than or equal to about 8 hours, still more specifically greater than or equal to about 10 hours, and still more specifically greater than or equal to about 12 hours, as measured from the point of initial contact of the co-curable components of the silicone composition with any catalyst. In a specific embodiment, the silicone composition has a pot life of about 12 hours to about 9 days.

The cure time of a silicone composition is desirably short at elevated temperatures. Thus a cure time at elevated temperature of about 1 to about 20 minutes, specifically about 2 to about 10 minutes, more specifically about 2.5 to about 7 minutes, and still more specifically about 3 to about 6 minutes is useful. Such cure times are desirable where rapid, efficient mixing, heating, and/or curing, and automated dispensing of the composition are used.

A suitable silicone composition can have, relative to a faster curing silicone composition with a short pot life, a lower level of curing agent, higher level of catalyst inhibitor, higher content by weight of active crosslinking groups (such as alkenyl groups and active silicon hydride groups) in the silicone composition, or a combination comprising one or more of these limitations, sufficient to increase the room temperature cure time from about 1 to about 20 minutes to greater than or equal to about 7 days. Where the cure time at room temperature is increased to this extent, temperature or other means of effecting cure can permit a controllable, shorter working lifetime that is suitable for use with manufacturing processes that require manipulation of a silicone composition pre-cure, with cure effected under a controllable set of conditions. Use of heat, ultraviolet radiation, visible light radiation, pressure, or a combination comprising one at least one of the foregoing conditions, can be used to effect curing. In a specific embodiment, the silicone composition is cured at a temperature of greater than or equal to about 80° C., specifically greater than or equal to about 90° C., more specifically greater than or equal to about 100° C., still more specifically greater than or equal to about 125° C., and still more specifically greater than or equal to about 150° C. In this way, in one embodiment, a suitable silicone composition can permit a working lifetime at about 100° C. of less than about 30 minutes, specifically less than about 25 minutes, more specifically less than about 20 minutes, and still more specifically less than or equal to about 15 minutes. In another embodiment, a suitable silicone composition can permit a working lifetime at about 125° C. of less than about 12 minutes, specifically less than about 10 minutes, more specifically less than about 9 minutes, and more specifically less than 8 minutes. In another embodiment, a suitable silicone composition can permit a working lifetime at about 150° C. of less than about 10 minutes, specifically less than about 8 minutes, more specifically less than about 6 minutes, and more specifically less than about 5 minutes.

Alternatively, a stepped cure process can be used, for example a first cure at a lower temperature (e.g., 60 to 80° C.) for a first period of time (e.g., 5 to 15 minutes), followed by a higher temperature cure (e.g., 90 to 130° C.) for a second period of time (e.g., 5 to 20 minutes. Post-curing can be used with any of the foregoing cure regimes, for example at 80 to 150° C., specifically 100 to 140° C. for a period of time (e.g., 30 minutes to 3 hours). Postcure is especially useful to enhance adhesion of the silicone layer to the backing layer.

Where a platinum catalyzed system is used, poisoning of the catalyst can occur, which can cause formation of an uncured or poorly cured silicone composition that is low in strength. Additional platinum can be added, for example SYLOFF 4000 from Dow Corning. However, when a large amount of platinum is added to improve cure, the pot life or working time can be adversely affected. Methyl vinyl cyclics can be used in this situation as a cure retardant, for example 1-2287 Cure Inhibitor from Dow Corning. Such materials bind the platinum at room temperature to prevent cure and hence, improve the working time, but release the platinum at higher temperatures to affect cure in the oven in the required period of time. The level of platinum and cure retardant can be adjusted to alter cure time and working time/pot life. When an excess platinum level is used, it is typically less than or equal to about 1 wt % of the total weight of organopolysiloxane mixture and filler and other additives. Specifically, within this range, the additional platinum concentration (i.e., the amount over that required) is greater than or equal to about 0.05 wt %, more specifically greater than or equal to about 0.15 wt % based on the total weight of organopolysiloxane mixture. Also within this range, the additional platinum concentration is less than or equal to about 0.6 wt %, more specifically less than or equal to about 0.45 wt %, depending on type and amount of filler used.

The cure retardant concentration (if a cure retardant is used) is less than or equal to about 0.3 wt % of the total composition. Specifically, within this range, the cure retardant concentration is greater than or equal to about 0.005 wt %, more specifically greater than or equal to about 0.025 wt % based on the total weight of the organopolysiloxane mixture. Also within this range, the cure retardant concentration is less than or equal to about 0.2% by weight, more specifically less than or equal to about 0.1% by weight based on the total weight of organopolysiloxane mixture and the required working time or pot life.

Molecular sieves can also be mixed into the formulation to remove any water associated with the presence of additives such as filler for example, and other components of the composition. Use of molecular sieve can help reduce the poisoning of the catalyst. Typical amounts of the sieve are up to about 1 to about 5 wt %, specifically about 1 to about 3 wt %, and more specifically about 1.5 to about 2.5 wt %, based on the total weight of the silicone composition. An example of a suitable sieve is 3Å sieve from UOP Corporation, Des Plaines, Ill.

The cured silicone layer in accordance with the present invention has a Shore A durometer of less than or equal to about 60, specifically less than or equal to about 50, more specifically less than or equal to about 40, still more specifically less than or equal to 30, and still more specifically less than or equal to 25 measured according to ASTM D2240-05. In a specific embodiment, the cured silicone composition has a Shore A durometer of 5 to about 20, specifically 10 to about 20. In another specific embodiment, the cured silicone composition has a Shore A durometer of about 20 to about 40. Such higher durometer silicones can have improved tensile properties.

The silicone grips are described in more detail in reference to the various Figures. In FIG. 1, a silicone grip 2 comprises a silicone film layer 4 and an adhesive layer 6. The silicone layer 4 has an exterior surface 8 and an interior surface 10, upon which the adhesive layer 6 is disposed. The exterior surface 8 provides traction, or a slip-resistant surface to an article.

Grip-ability or slip-resistance is at least partly a function of the coefficient of friction of the exterior surface 8. The coefficient of friction of the cured silicone layer can be adjusted to provide the desired degree of grip-ability to the surface of an article, and can be measured, for example, using ASTM D-1894-01. A particularly advantageous feature of the silicone composition is that it provides a sufficient coefficient of friction under wet or dry conditions, together with excellent tactile feel. As is known, the coefficient of friction of a surface depends at least partly on its surface texture.

Thus, the exterior surface 8 of the silicone grip 2 can be smooth or textured, and is selected so as to improve the coefficient of friction, provide improved traction and/or slip-resistance, and/or provide a desirable tactile feel under various usage conditions (e.g., rain, sweat, dust, dirt, sand, and so forth). The particular surface finish is selected depending on considerations such as intended use (i.e., the article to which the surface grip will be adhered), intended conditions of use (e.g., wet, dry, sandy, etc.), desired durability, ease of manufacture, and the like. A single grip can have a variety of finishes, for example one portion of the exterior surface 8 can have a smooth surface finish, and another portion of the exterior surface 8 can have a textured surface finish. Desirably, the surface finish is textured to improve the coefficient of friction of the surface under both wet and dry conditions.

Smooth surface finishes include ground and polished surfaces, as well as surfaces having a matte finish. Ground surface finishes generally comprise average roughness (Ra) values that are less than or equal to about 50 microinches (μin) (1.27 micrometers)). Exemplary ground finishes can be represented by the Society for the Plastic Industry's surface finish characterization system, such as an SPI #6 surface finish, which is representative of surfaces produced using 320-grit paper that exhibit an Ra of about 38 to about 42 μin (0.97 to 1.07 micrometers), or an SPI #4 surface finish, which is representative of surfaces produced using 600-grit paper that exhibit an Ra of about 2 to about 3 μin (0.051 to 0.075 micrometers). Exemplary polished finishes (i.e., glossy or high gloss finishes) generally comprise Ra values that are less than or equal to about 5 μin (0.127 micrometers), such as an SPI #3 surface finish, which is representative of surfaces produced via polishing with a grade #15 diamond buff and exhibit an Ra of about 2 to about 3 μin (0.051 to 0.075 micrometers), or an SPI #1 surface finish, which is representative of surfaces produced via polishing with a grade #3 diamond buff and exhibits an Ra of about 1 μin (0.025 micrometers). Matte finishes (i.e., low gloss finishes), have Ra values greater than about 50 microinches (1.22 micrometers), and can be produced via grit blasting (e.g., glass bead blasting), ball peening, electrical discharge machining (EDM), and so forth. In another embodiment, textures imitating that of leather can be provided via an etching process (e.g., chemical etching), lithographic process, and the like.

Figure 2:
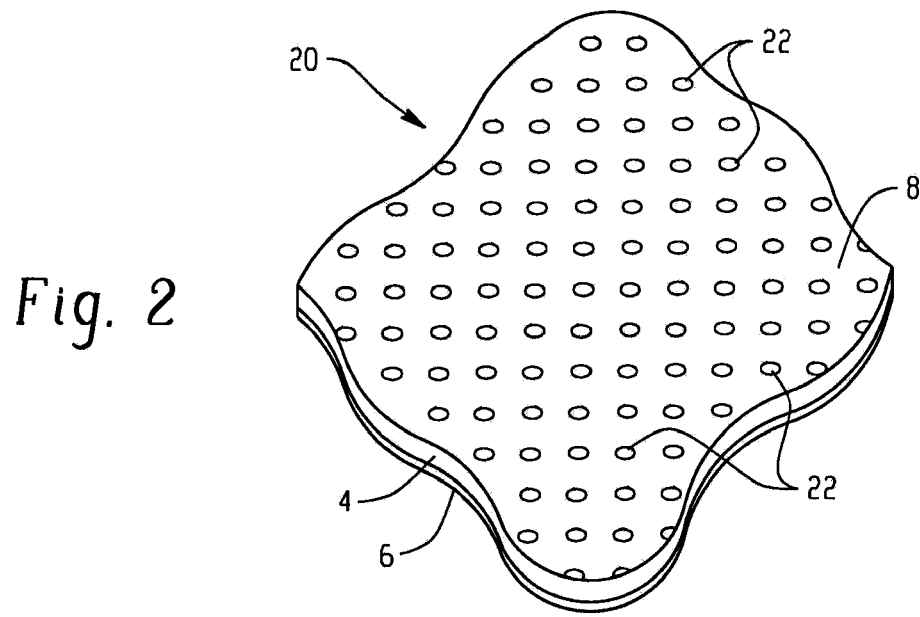
FIG. 2 is an oblique and partial view of an exemplary textured silicone grip.
Figure 3:
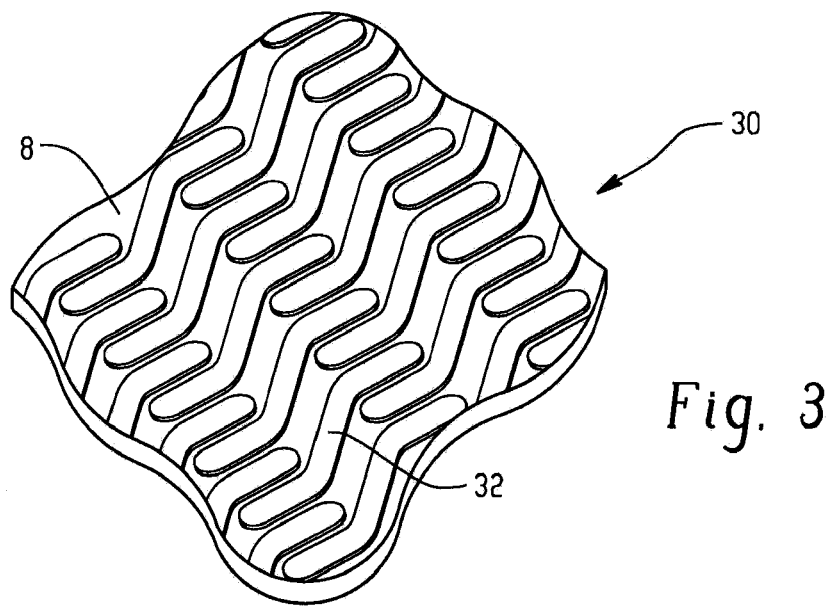
FIG. 3 is an oblique and partial view of an exemplary textured film comprising a tessellated texture on an exterior film surface.

Textured surface finishes as used herein include surfaces having features with a depth (or height) greater than about 500 micrometers, and can also be imparted by methods such as molding, stamping, mechanically treating, chemical etching, and the like. The texture can be random or patterned. Examples of textured surfaces include bumps (e.g., convex squares or convex dimples), depressions (e.g., concave squares or concave dimples), striations, cross-hatches, wavy lines, patterns (e.g., textures imitating fish scales, snakeskin, ostrich, leather, and so forth), tessellated patterns, random geometrical features (e.g., a texture imitating stonework), parallel structures, and so forth, as well as combinations comprising at least one of the foregoing textures. For example, as shown in FIG. 2, a silicone surface grip 20 comprises concave dimples 22 that are disposed in the exterior surface 8 of silicone film layer 4. In FIG. 3, another exemplary surface grip 30 comprises a tessellated texture 32 comprising "S-shaped" surface features that protrude from the exterior surface 8 of silicone film layer 4.

In one embodiment, the textured surface is a smooth surface with a coefficient of friction sufficient to provide slip-resistance to the surface of an article. To be more specific, the exterior surface 8 is a smooth surface that exhibits a static coefficient of friction on dry glass of greater than or equal to about 5, and/or a kinetic coefficient of friction on dry glass of greater than or equal to about 3.5 determined in accordance with ASTM D 1894-01, using a sled weight of about 100 grams (g). Alternatively or in addition, the exterior surface 8 is a smooth surface that exhibits a static coefficient of friction on dry stainless steel that is greater than or equal to about 5, and/or a kinetic coefficient of friction on dry steel of greater than or equal to about 3.5 determined in accordance with ASTM D 1894-01, using a sled weight of about 100 g.

In another embodiment, the textured surface is a dimpled convex surface with a coefficient of friction sufficient to provide slip-resistance to the surface of an article. To be more specific, the exterior surface 8 is a dimpled convex surface that exhibits a static coefficient of friction on glass of greater than or equal to about 11, and/or a kinetic coefficient of friction on glass of greater than or equal to about 7.5 determined in accordance with ASTM D 1894-01, using an about 100 gram sled weight. Alternatively or in addition, the exterior surface 8 exhibits a static coefficient of friction on dry stainless steel that is greater than or equal to about 8, and/or a kinetic coefficient of friction on steel of greater than or equal to about 6, determined in accordance with ASTM D 1894-01, using an about 100 gram sled weight.

A particular advantage of the present silicone compositions is that such compositions can be manufactured to have a balanced coefficient of friction. A high coefficient of friction is important for providing good grippability but surfaces with too high a coefficient of friction tend to feel sticky, and thus do not have good tactile feel or touch properties. In addition, surfaces with higher coefficients of friction tend to collect more dust and dirt, which negatively affects the appearance of the surface and its grip properties. Accordingly, the cured silicone layers are manufactured to have a maximum static coefficient of friction on dry glass of about 40, specifically about 35, more specifically about 30, even more specifically about 20, even more specifically about 15, still more specifically about 10, and/or a maximum kinetic coefficient of friction on dry glass of about 30, specifically about 25, more specifically about 20, even more specifically about 15, still more specifically about 10, each determined in accordance with ASTM D 1894-01, using an about 100 gram sled weight. In another embodiment, the cured silicone layers are manufactured to have a maximum static coefficient of friction on dry stainless steel of about 40, specifically about 35, more specifically about 30, more specifically about 25, even more specifically about 20, even more specifically about 15, still more specifically about 10, and/or a maximum kinetic coefficient of friction on dry stainless steel of about 30, specifically about 25, more specifically about 20, even more specifically about 15, still more specifically about 10, each determined in accordance with ASTM D 1894-01, using an about 100 gram sled weight.

Silicone grips of the type exemplified in FIGS. 1-3 are especially useful in applications wherein a slip resistant surface is desired on a contoured surface, because the silicone film layers are malleable, and can conform to the contoured surface (e.g., be stretched on and/or wrapped around the surface). Where the silicone grip is used on a contoured, e.g., curved or irregularly shaped surface, the properties of the silicone film layer are selected so as to provide the desired degree of malleability. For example, the silicone film layer can exhibit an elongation of greater than or equal to about 100%, more specifically greater than or equal to about 250%, even more specifically greater than or equal to about 500% as measured by ISO-527-1993. The thickness of the silicone layer can be modified to provide the desired flexibility (e.g., as the thickness of the silicone layer 4 decreases, flexibility and malleability of the layer will increase).

Alternatively, or in addition, the surface texture of the silicone film layer can be configured to provide the desired properties. For example, the surface can be patterned to provide a greater degree of flexibility and/or stretchability in one portion of the silicone film layer, or the silicone film layer can be configured to comprise a reduced thickness that can provide additional flexibility of the silicone film layer 4. A particular texture can also be imparted to the silicone layer for aesthetic purposes. Where the layer is transparent (as described in further detail below), a smooth surface is generally used. A convexly dimpled surface minimizes the appearance of contaminants on the surface (e.g., dust, hair, lint, and the like).

The thickness of silicone layer 4 is further selected so as to provide the desired service life (e.g., one year), in combination with the desired surface texture. The specific thickness of the silicone film layer 4 will be determined upon evaluation of the material properties (e.g., tear strength, tensile strength, durometer, and so forth) and variables associated with the use of the surface grips used (e.g., variables such as environment, forces, and so forth). The thickness of a highly textured surface, such as is shown in FIG. 3, will vary because of the texturing present on the surface. In many applications the silicone film layer 4 has a maximum thickness of less than about 6,000 micrometers, more specifically less than about 4,500 micrometers, even more specifically less than about 3,000 micrometers. The minimum thickness is greater than about 10 micrometers, more specifically greater than about 25 micrometers, even more specifically greater than about 50 micrometers. One advantageous feature of the silicone grips is that desirable surface characteristics such as softness and high coefficient of friction can be attained together with durability, even in thin films. Accordingly, in a preferred embodiment, both the maximum and minimum thickness of the silicone film layer 4 is in the range of about 10 to about 250 micrometers, more specifically 10 to about 150 micrometers, even more specifically about 10 to about 50 micrometers.

The adhesive layer 6 is selected to as to provide adequate adhesion of silicone film layer 4 to a substrate, that is, a surface of an article, under the conditions of use. In one embodiment the adhesive is a pressure-sensitive adhesive (PSA). The PSA can be rubber, acrylic, modified acrylic, or silicone adhesives, and are selected based on the article and its use and for compatibility with the silicone film layer and the article. Rubber PSAs are generally synthetic, nonlatex rubbers such as styrene block copolymers, formulated with tackifying resins, oils, and antioxidants. These adhesives provide adhesion to low-surface-energy materials such as plastics, and generally perform best at temperatures less than about 150° F.). Rubber PSAs can be formulated to achieve adhesion in high-moisture applications. Acrylic PSAs generally have better resistance to solvents, ultraviolet (UV) light, elevated temperatures, plasticizers, chemical reagents, and sterilization methods than rubber based PSA's. Modified acrylic adhesives are prepared from acrylic polymers and incorporate additional components such as tackifiers found in rubber systems. Modified acrylics offer improved initial tack and adhesion to low-surface-energy materials compared with nontackified acrylic formulations, but can have decreased resistance to solvents, plasticizers, UV light, and sterilization, shear properties and temperature. Silicone pressure sensitive adhesives generally have low initial tack and adhesion, but excellent temperature performance (to about 700° F. (371° C.)) and resistance to chemicals, as well as consistent bonding to silicone substrates.

The adhesive layer 6 is used in an amount that provides sufficient adhesion (e.g., peel strength) between the grip and the substrate. Such amounts can be readily determined by one of ordinary skill in art, and can be, for example, a thickness of about 1 to about 100 micrometers, more specifically about 5 to about 75 micrometers, even more specifically about 10 to about 50 micrometers.

Figure 4:
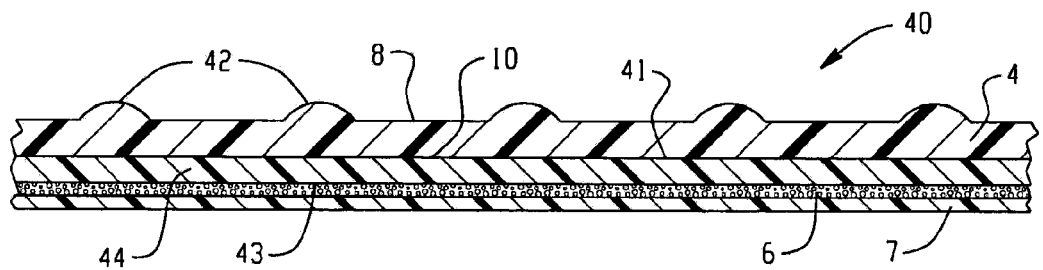
FIG. 4 is a partial and cross-sectional view of one embodiment of a multilayer silicone grip comprising a silicone layer and a backing layer, together with an optional adhesive layer and release layer.

In another embodiment, the silicone grip is a multilayer construction comprising a silicone film layer, a backing layer, and an adhesive layer for adhering the multilayer construction to a substrate. This embodiment is illustrated in FIG. 4, wherein an exemplary multilayer film 40 comprises a silicone film layer 4 having an exterior surface 8 and an interior surface 10 that is opposite surface 8. Convex dimples 42 on exterior surface 8 provide enhanced grip-ability. A backing layer 44, having a first side 41 and a second side 43, is disposed on interior surface 10. An optional adhesive layer 6 is disposed on the second side 43 of the backing layer 44, opposite the side in contact with the silicone layer. Suitable adhesive layers 6 for use in the multilayer construction are similar to those discussed above in relation to silicone grip 2. An optional removable release layer 7 is disposed on the adhesive layer to protect it during storage and shipping The backing layer 44 can comprise a wide variety of materials to which the silicone layer can be adhered by direct or indirect means, including a plastic, an elastomer that is higher modulus than the modulus of the silicone layer 8, a cellulosic material, a lignocellulosic material, a natural fiber (e.g., cotton), a metal, a ceramic, a glass, or a combination comprising one or more of these. The backing layer can enhance a wide variety of properties of the cured silicone layer, including mechanical strength, toughness, moldability, tear resistance, cost, and/or additional aesthetic effects such as color, glow-in-the-dark, and optical effects carrying capability. The material is accordingly selected based on the desired properties, for example malleability (or stiffness), conductivity, and other considerations such as compatibility with the article and the conditions of its intended use, cost, ease of manufacture, and the like. For example, if it is desired to impart stiffness to the silicone film layer (for manufacturing, durability or other purposes), a stiff backing layer such as metal or a hard plastic can be used. Where a malleable and/or stretchable grip is desired, the substrate is selected so as to provide improved tear resistance and strength but with the desired degree of malleability or stretchability and conformability to allow easy application to an article with curved and/or compound curved surfaces. In some instances, the backing layer provides a protective barrier between the substrate and the article.

Thermoplastic or thermosetting polymers can be used where the backing layer comprises a plastic. Suitable thermoplastic polymers include, but are not limited to, polycarbonates, including aromatic polycarbonates and copolymers thereof, polyacetals, polyarylene ethers, polyphenylene ethers, polyarylene sulfides, polyphenylene sulfides, polyimides, polyamideimides, polyetherimides, polyetherketones, polyaryletherketones, polyetheretherketones, polyetherketoneketones, polyamides, polyesters, liquid crystalline polyesters, polyetheresters, polyetheramides, polyesteramides, and a combination comprising at least one of the foregoing thermoplastic resins.

The backing layer can also comprise a cured, uncured or at partially cured thermoset resin, including, but not limited to, polyurethanes, and those derived from epoxys, cyanate esters, unsaturated polyesters, diallylphthalate, acrylics, alkyds, phenol-formaldehyde, novolacs, resoles, bismaleimides, PMR resins, melamine-formaldehyde, urea-formaldehyde, benzocyclobutanes, hydroxymethylfurans, isocyanates, homo- and copolymeric aliphatic olefin and functionalized olefin polymers, and their alloys or blends, for example polyethylene, polypropylene, thermoplastic polyolefin (TPO), ethylene-propylene copolymer, poly(vinyl chloride), poly(vinyl chloride-co-vinylidene chloride), poly (vinyl fluoride), poly(vinylidene fluoride), poly(vinyl acetate), poly(vinyl alcohol), poly(vinyl butyral), poly(acrylonitrile), acrylic polymers such as those of (meth)acrylamides or of alkyl (meth)acrylates such as poly(methyl methacrylate) (PMMA), and polymers of alkenylaromatic compounds such as polystyrenes, including syndiotactic polystyrene. In some embodiments addition polymer substrates are polystyrenes and especially the so-called acrylonitrile-butadiene-styrene (ABS) and acrylonitrile-styrene-acrylate (ASA) copolymers, which can contain thermoplastic, non-elastomeric styrene-acrylonitrile side chains grafted on an elastomeric base polymer of butadiene and alkyl acrylate, respectively.

Blends of any of the foregoing polymers can also be used. Thermoset resin substrates can further comprise, for example, a thermoplastic polymer such as polyphenylene ether, polyphenylene sulfide, polysulfone, polyetherimide, or polyester. Typical blends can also be those comprising PC/ABS, PC/ASA, PC/PBT, PC/PET, PC/polyetherimide, PC/polysulfone, polyester/polyetherimide, PMMA/acrylic rubber, polyphenylene ether-polystyrene, polyphenylene ether-polypropylene, polyphenylene ether-polyamide or polyphenylene ether-polyester.

Surprisingly, it has been found that a backing layer comprising a polyester such as polyethylene terephthalate (PET) can have excellent adhesion to the cured silicone layer. Without wishing to be bound by theory, the increased adhesion between layers can be attributable to a greater compatibility between the PET and adjacent silicone layer. The reactive group can provide a point of interaction between the backing layer or substrate and the silicone composition by bond formation or by an interaction such as dipole-dipole, hydrogen bonding, or dispersive, and thereby resulting in cured compositions having improved adhesion. The improved adhesion of the silicone composition to the backing layer or substrate can impart an improved durability of the article formed therefrom, by increasing the force needed to effect delamination between the silicone, and the backing layer or substrate.

The backing layer can also comprise natural material, for example a cellulosic and/or lignocellulosic material such as, wood, paper, cardboard, fiber board, particle board, plywood, construction paper, Kraft paper, cellulose nitrate, cellulose acetate butyrate, and like. Blends of a cellulosic material and either a thermoset resin (such as an adhesive including epoxy or phenolic resole), a thermoplastic polymer (including a thermoplastic polymer, such as PET or polycarbonate), or a mixture comprising a thermoset resin and a thermoplastic polymer, can be used.

The backing layer can also comprise a material, in particular a polymeric elastomer that has been rendered electrically conductive. Suitable elastomers include those having an intrinsic Shore A Hardness of less than or equal to about 80, specifically less than or equal to about 60, and more specifically less than or equal to about 40, and include, for example, those such as styrene butadiene rubber (SBR), EPDM, silicones, EPR, polyolefins, polyvinyl chlorides, or combinations comprising at least one of the foregoing elastomeric materials.

The backing can act as a protective buffer between the cured silicone layer and the substrate. Chemical functional groups such as amines, sulfur, thiols, sulfides, disulfides, thioesters, thiocarbamates polysulfides, polysulfones, phosphorous compounds, acidic material, plasticizers, and the like, have been found to interfere with the cure and/or stability of organopolysiloxanes. Where the substrate comprises such substituents or compounds, the backing layer provides a chemical and/or physical barrier that can allow cure to proceed and/or stabilize the cured layer. Desirably, a surface to which the silicone composition is contacted prior to and/or during cure is free of or has low concentrations of the foregoing groups. Also desirably, where such groups are present in the substrate, a backing layer disposed between the silicone layer and substrate can be used. In an embodiment, where the surface is a backing layer, the backing layer comprises less than or equal to 1 wt %, specifically less than or equal to 0.1 wt %, more specifically less than or equal to 0.01 wt %, and more specifically less than or equal to 0.005 wt % of compounds or compounds comprising the foregoing cure-interfering groups. Examples of suitable commercially available backing layers include Melinex® PET films from Dupont Teijin Films, Hopewell Va., and Kapton® polyimide films from DuPont.

In one specific embodiment, wherein a flexible, stretch-resistant multilayer film is desired, the backing layer 44 is a flexible, yet stretch-resistant material, such as a woven or non-woven fabric, metal foil, or stretch resistant polymer film (e.g., polyester, polyetherimide, polyamide, polyimide, and so forth). Specifically, the substrate 44 comprises an elastic polymer having a thickness that allows the multilayer film 50 to be flexible, yet resists stretching.

The release layer 7 can be formed from a material known for its release properties, including many of the above-described polymeric materials useful as backing layers. The material of the release layer is selected to provide the desired flexibility, strength, and releasability from the adhesive layer. In one embodiment a release layer comprises a release-coated poly(ethylene)terephthalate.

Figure 5:
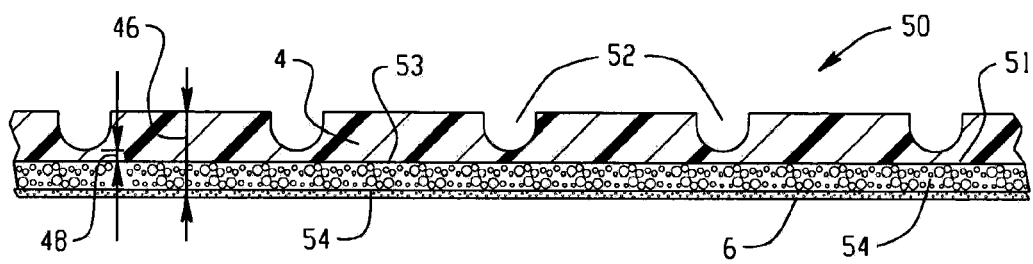
FIG. 5 is a partial and side view of a multilayer film comprising a silicone layer having a textured exterior surface.

The backing layer can also be in the form of a foam. As shown in FIG. 5, an exemplary multilayer film 50 comprises a cured silicone film layer 4 as described above. Silicone film layer 4 has an exterior surface 8, comprising a crosshatched pattern 52, and an interior surface 51 that is opposite exterior surface 8. A backing layer 54, having a first side 53 and a second side 55, is disposed on the interior surface 51 of the silicone layer 4. An adhesive layer 6 is disposed on the second surface 45 of the substrate 44. Suitable adhesive layers 6 for use in the multilayer construction are similar to those discussed above. Use of a foam substrate can provide compressibility and malleability to the multilayer film 50, as well as reduction in vibration, noise, and shock. In applications wherein a slip resistant surface is desired on a contoured surface, a foam can be particularly useful, and backing layer 54 is selected so that it can conform to the surface (e.g., stretch and/or wrap around the surface).

As used herein, "foams" refers to materials having a cellular structure. Suitable foams have densities lower than about 65 pounds per cubic foot (pcf), specifically less than or equal to about 55 pcf, and/or a void volume content of about 20 to about 99%, specifically greater than or equal to about 30%, based upon the total volume of the polymeric foam. In one embodiment the foam has a density of about 10 to about 30 pounds per cubic foot ($lb/ft^3$) (about 160 to about 481 $kg/m^3$), a 25% compression force deflection (CFD) about 0.5 to about 20 $lb/in^2$ (about 0.3 to about 1.41 $kg/m^2$), an elongation to break of about 50 to about 110%, and a compression set at about 70° F. (21° C.) of less than about 1%.

The foams can be a natural material such as cork, or a polymeric material. Specific examples of thermoplastic resins that can be used to form polymeric foams include polyacetals, polyacrylics, styrene acrylonitrile, acrylonitrile-butadiene-styrene, polyurethanes, polycarbonates, polystyrenes, polyethylenes, polypropylenes, polyethylene terephthalates, polybutylene terephthalates, polyamides such as, but not limited to Nylon 6, Nylon 6,6, Nylon 6,10, Nylon 6,12, Nylon 11 or Nylon 12, polyamideimides, polyarylates, ethylene propylene rubbers (EPR), polyarylsulfones, polyethersulfones, polyphenylene sulfides, polyvinyl chlorides, polysulfones, polyetherimides, polytetrafluoroethylenes, fluorinated ethylene propylenes, polychlorotrifluoroethylenes, polyvinylidene fluorides, polyvinyl fluorides, polyetherketones, polyether etherketones, polyether ketone ketones, and the like, or combinations comprising at least one of the foregoing thermoplastic resins, for example acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polycarbonate/thermoplastic polyurethane, polycarbonate/polyethylene terephthalate, polyethylene/nylon, and the like.

Examples of polymeric thermosetting resins that can be used in the polymeric foams include polyurethanes, natural rubber, synthetic rubber, ethylene propylene diene monomer (EPDM), epoxys, phenolics, polyesters, polyamides, silicones, or the like, or combinations comprising at least one of the foregoing thermosetting resins.

Manufacture of the foams is generally particular to the specific polymer or polymer blend used. For example, in the case of thermoplastics one exemplary process involves dispersing a blowing agent within the polymer wherein the blowing agent is capable of reacting at elevated temperatures (e.g., greater than about 200° F. (93° C.)) to form gases which foam the polymer melt. For thermosetting polymers one exemplary process involves frothing the thermosetting composition (comprising, e.g., polymer, catalyst, cross-linking agent, additional fillers, and the like) using mechanical beating. Once the composition has been frothed, it can be introduced into a mold or spread onto a sheet or spread onto a continuously moving sheet or belt and subsequently cured.

In one embodiment, a silicone foam substrate is used. Suitable silicone foam substrates can be produced using polysiloxane polymers, or even several polysiloxane polymers, each having different molecular weights (e.g., bimodal or trimodal molecular weight distributions). It is also possible to have several polysiloxane base polymers with different functional or reactive groups in order to produce the desired foam. It is generally desirable to have about 0.2 moles of Si—H groups per mole of water. Depending upon the chemistry of the polysiloxane polymers used, a catalyst (e.g., platinum or a platinum-containing catalyst) can be used to catalyze the blowing and the curing reaction. The catalyst may be deposited onto an inert carrier, such as silica gel, alumina, or carbon black. Unsupported catalysts, such as chloroplatinic acid and forms of chloroplatinic acid (e.g., its hexahydrate form, as alkali metal salt, and its complexes with organic derivatives) can be used. In addition, reaction products of chloroplatinic acid can be used, such as, alcohols, ethers, and aldehydes.

Other effective catalysts include platinum chelates and platinous chloride complexes with phosphines, phosphine oxides, and with olefins such as ethylene, propylene, and styrene. It may also be desirable, depending upon the chemistry of the polysiloxane polymers to use other catalysts such as dibutyl tin dilaurate in lieu of platinum based catalysts.

Blowing agents (including water) generally comprise about 1 to about 20 weight percent (wt. %), or more specifically, about 2 to about 15 wt. %, and even more specifically about 3 to about 10 wt. % of the silicone composition. When a blowing agent has a boiling point at or below ambient temperature, it is maintained under pressure until mixed with the other components. A combination of blowing agents can also be used to obtain foams having desirable characteristics. For example, a physical blowing agent such as a chlorofluorocarbon may be added as a secondary blowing agent to a reactive mixture wherein the primary mode of blowing is the hydrogen released as the result of the reaction between water and hydride substituents on the polysiloxane. Various platinum catalyst inhibitors can be used to control the kinetics of the blowing and curing reactions in order to control the porosity and density of the silicone foams. Examples of such inhibitors are polymethylvinylsiloxane cyclic compounds and acetylenic alcohols.

The thickness and other characteristics of the backing layer (whether solid or foamed) will depend on the specific properties desired, the properties of the materials used (e.g., tear strength, tensile strength, durometer, and so forth) and the application in which the grip is to be used (e.g., variables such as environment, temperature, forces, and so forth). In most applications, the thickness of the backing layer is about 10 to about 6,000 micrometers, more specifically about 25 to about 3,000 micrometers, even more specifically about 50 to about 1,000 micrometers. Where the substrate is used to provide additional compressibility, it can be a thicker foam. However, if the substrate is used to reinforce the silicone film and/or reduce the elasticity of the silicone film layer, a thinner, non-foamed substrate can be used, having, for example a thickness of about 10 to about 2,000 micrometers, more specifically about 1 to about 1,000 micrometers, even more specifically about 100 to about 500 micrometers, specifically about 75 to about 750 micrometers, specifically 25 to 500 micrometers, more specifically 50 to 400 micrometers, about 1 to about 55 micrometers, about 1 to about 50 micrometers, even more specifically about 2 to about 45 micrometers, and still more specifically about 5 to about 40 micrometers.

Figure 6:
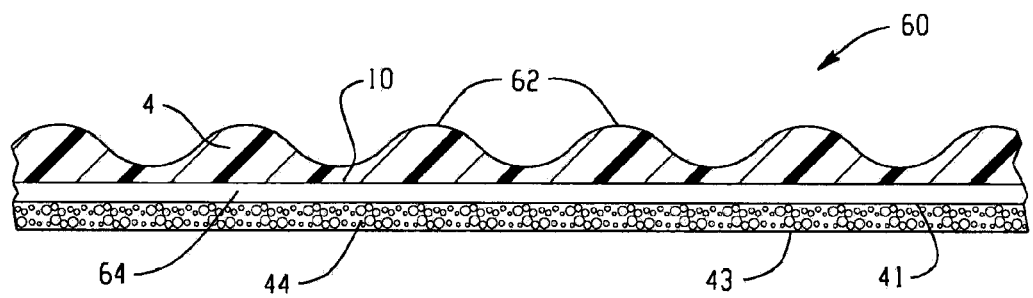
FIG. 6 is a partial side view of a multilayer film comprising a silicone layer having silicone bumps formed thereon.

In other embodiments, the multilayer films comprise an additional layer(s). For example, as shown in FIG. 6, a multilayer film 60 comprises a silicone layer 4 having rounded silicone ridges 62 formed therein and a solid backing layer 44 having a first side 41 and a second side 43. Disposed on the interior surface 10 of the silicone layer 4 is a tie layer 64, which joins the silicone layer 4 to the first side 41 of the substrate 44. An adhesive layer 6 can optionally be disposed on the second side 43 of the backing layer 44 after manufacture of the multilayer film 60 (not shown). Alternatively, the adhesive layer can be disposed on the surface of the article, and the multilayer film adhered to the surface via the second side 43 and the adhesive.

The tie layer 64 is used to improve adhesion (e.g., bonding) between the two layers. Materials for use in the formation of tie layers are known in the art, and include for example, chemical treatment using adhesion promoters or primers, including reactive compounds such as acrylate monomers and oligomers, isocyanate-terminated polyurethanes, and the like. The tie layer material is selected based on its compatibility with the silicone film and the substrate layer. In addition to, or instead of, a tie layer, the surface of the substrate can be treated to enhance adhesion, for example subjected to thermal treatment, corona discharge, ozonolysis, mechanical roughening, chemical roughening (i.e., etching) and the like, or combinations comprising at least one of the foregoing treatments.

Figure 7:
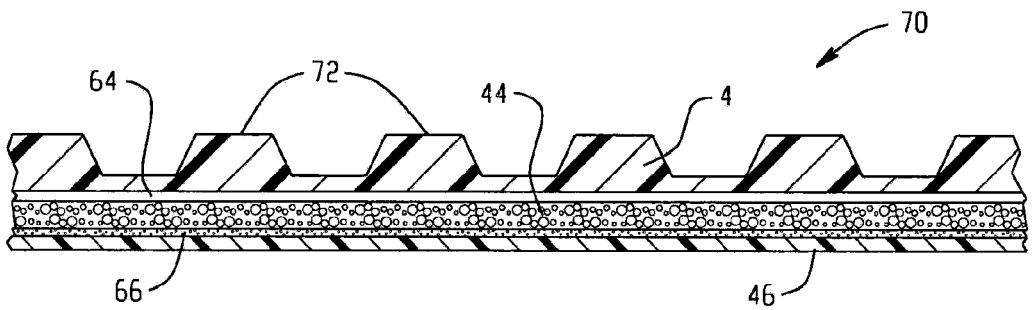
FIG. 7 is a multilayer film comprising a silicone layer having silicone ridges formed thereon.

Another exemplary embodiment is shown in FIG. 7, where a multilayer film 70 comprises a cured silicone layer 4 having ribs 72 formed therein, a tie layer 64, and a foamed backing layer 44. An adhesive layer 66 joins the backing layer 44 to a second backing layer 46. Suitable adhesives include those described above. In the embodiment shown in FIG. 7, the first backing layer 44 is a foam that provides softness and malleability to the grip, while the second backing layer 46 can be used, for example, to prevent stretching of the grip, provide improved tensile strength, and/or increase the tear resistance of the grip. In one specific embodiment, wherein the multilayer film will be exposed to operating temperatures above about 120° F. (e.g., kitchen utensils, hair dryers, curling irons, deck furniture, steering wheels, coffee mugs, and so forth) and softness and resistance to stretching is desired, the film comprises a first backing layer 44 formed from a foamed silicone material having a thickness, e.g., of about 1,000-3,000 micrometers, as well as a second backing layer 46 formed from a nonelastomeric material such as a polyethylene terephthalate polymer having, e.g., a thickness of about 250 to 750 micrometers. Other combinations of first and second backing layers can be selected to provide other properties. The multilayer film can further comprise an adhesive layer for adhering the multilayer film to the article (not shown) and a release layer (not shown) disposed on the exposed surface of the adhesive layer, to protect the exposed surface of the adhesive during manufacture, storage, and shipping, and which is removed prior to application of grip to the article surface.

Figure 8:
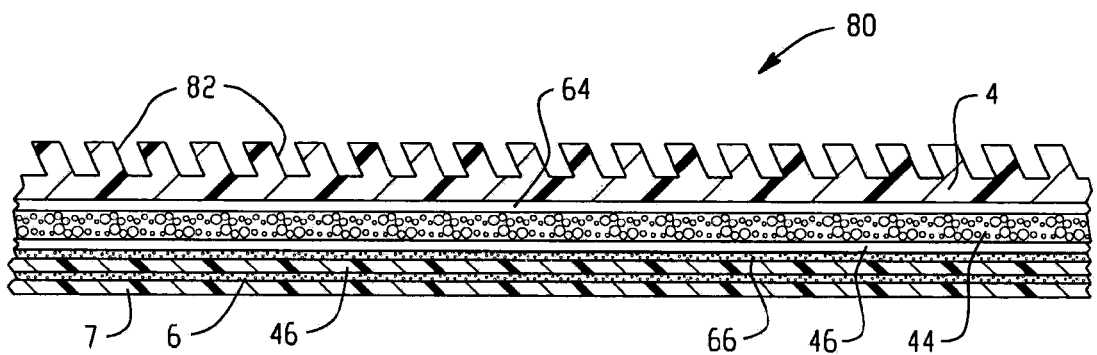
FIG. 8 is a multilayer film comprising a silicone layer having angled ribs formed thereon.

It is to be understood that an adhesive layer can be used in place of or in addition to a tie layer in any of these embodiments, e.g., tie layer 64 can be supplemented with an adhesive layer or substituted with an adhesive layer. In FIG. 8, a multilayer film 80 comprises a cured silicone layer 4 having angled ribs 82 formed therein, a tie layer 64, and a foamed backing layer 44. A tie layer 76 joins the first backing layer 44 to an adhesive layer 66 and second backing layer 46. Adhesive layer 6 is protected by release layer 7.

Any of the individual layers (e.g., layers such as the silicone layer 4, first backing layer 44, second backing layer 46, adhesive layer 6, tie layer 64, second tie layer 66, and so forth) or combination of layers that comprise a film 2 or a multilayer films (e.g., 20, 30, 40, 50, 60, 70, 80) can contain additives such as colorants, pigments, dyes, impact modifiers, stabilizers, color stabilizers, heat stabilizers, light stabilizers, UV screeners, UV absorbers, flame retardants, anti-drip agents, fillers, flow aids, plasticizers, ester interchange inhibitors, antistatic agents, antioxidants, lubricants, plasticizers, blowing agents, mold release agents, and so forth, as well as combinations comprising at least one of the foregoing additives. For example, non-conductive reinforcing fillers (e.g., fumed silica, glass fibers, silicates, $TiO_2$, graphite, calcium carbonate, mica, talc, and the like) can be present in one or both parts, in amounts of about 10 wt. % to about 30% wt. % by weight of each part.

Antimicrobial, antiviral, or antiseptic additives can be particularly useful, particularly in the silicone layer 4. Exemplary antimicrobial additives include 2,4,4'-trichloro-2'-hydroxydiphenol ether and 5-chloro-2-phenol(2,4 dichlorophenoxy), commonly sold under the trademark MICROBAN, by Microban Products Co.; silver antimicrobials, such as AgION, by AgION Technologies Inc., and/or silver-sulfadiazine; antiseptics such as chlorhexidine for example, and so forth, as well as combinations comprising at least one of the foregoing. Antimicrobial additives can be use in silicone grips intended for use with, for example, the receiver of a public telephone, door handles, sporting equipment or apparatus (e.g., baseball bats, monkey bars, and so forth), railings and other supports used, e.g., in hospitals or nursing homes, and similar applications.

In addition to colorants, pigments, and the like, that can alter the optical characteristics of the multilayer film, any of the layers can also comprise graphics and/or optical features such as printing (e.g., pad printing, lithography, and so forth). For example, referring again to FIG. 4, the backing layer 44 can comprise graphics that can be viewed through the silicone layer 4. The graphics can comprise an adhesive graphic applied thereto or a graphic that is formed directly on a layer of the film. Further, it is to be apparent that combinations of additives and/or graphics can be present in and/or on differing layers of the film. Also, it will be appreciated by one skilled in the art that the multilayer film can be used with a variety of combinations of additives and layers to provide different and useful optical effects, and that the multilayer films are not limited to the particular combination, additives, layers, graphics, and compositions disclosed in the foregoing exemplary embodiments.

It is contemplated that the multilayer film can include one or more of the above described substrate, adhesive, tie and release layers in a variety of combinations to provide a suitable support for the silicone layer, and a suitable continuity with the surface of an article. Additional layers can also be present. For example, an ink-jet adhesive layer can be present, to allow for ink-jet printing onto the grip, commercially or at-home. A thermal transfer layer can also be present, to allow labelling using the grip. Further, where a colorant or other optical effects additives are present, different combinations of colorants and/or fillers can be present in different layers including the silicone layer, adhesive layer, or substrate. Additonal features can be present, for example perforations for easy separation of a smaller grip from a larger sheet of grips. The grips could also be combined with a dispenser. The multilayer films described above should therefore not be considered to limit the invention.

A convenient method for preparing the cured silicone from the curable silicone compositions comprises mixing the different components to homogeneity and removing air by degassing under vacuum. The composition is then cast onto a backing layer, adhesive composition, or release liner, and cured by holding the composition at room temperature (e.g., 25° C.), or by heating. When a non-reactive organosiloxane fluid is present, cure is at a temperature below the boiling point of the fluid so as to substantially prevent removal of the fluid during cure. Specifically, cure temperatures are at least about 20° C., specifically at least about 50° C., most specifically at least about 80° C. below the boiling point of the fluid component. When using reactive fluid, the cure temperature is such that the fluid cures before it can be driven off. An optional post-cure operation can be used. Where the cured silicone layer is formed onto a carrier, it can be coated with an adhesive or transferred to a backing layer. Transfer can be by laminating, rolling, or calendaring.

In a continuous method, the curable silicone mixture is transferred onto a moving carrier. Another layer of carrier film is optionally pulled though on top of the mixture and the sandwiched mixture is then pulled through a coater, which determines the thickness of the final elastomer. The composition is then cured, followed by an optional post-cure. In one embodiment, for ease of subsequent manufacture and lower cost, continuous manufacture in a roll form is used. This allows the manufacture of silicone from a liquid composition by casting continuous rolls in sheet form at varying thicknesses, with better thickness tolerance.

In a specific embodiment, the grip is manufactured by casting the curable composition onto a textured release layer, followed by cure. An adhesive is then applied to the side opposite the textured side. Alternatively, the curable composition is cast onto a textured release layer, and the backing layer is applied to the opposite side before cure. In another embodiment the backing layer applied to the opposite side before cure includes an adhesive and a release liner.

The textured surface can be provided by coating, casting, or injecting the curable silicone composition into a textured mold. In still another embodiment, a textured surface can be provided by contacting a partially cured silicone layer with a texturing surface to form the texture, then completing the cure to fix the texture. In a specific embodiment, the partially cured silicone layer is imprinted with a pattern transferred from a patterned roller. In another embodiment, the texture is formed by mechanically or chemically treating the cured silicone layer to create patterns in the silicone layer.

Use of two backing layers is advantageous where one layer could inhibit cure of the silicone composition. For example, if the curable silicone composition is disposed directly onto a polyurethane backing layer during or prior to cure, complete cure of the silicone composition can be inhibited. Increasing the amount of cure catalyst, decreasing the inhibitor loading where possible, passivating the surface of the polyurethane, or increasing the amount of reactive sites in the silicone composition can be used to overcome any decreased reactivity at the interface between a curing silicone composition and a polyurethane. Alternatively, where appropriate, use of a backing layer between the curable silicone composition and a polyurethane can overcome any difficulties with curing, specifically where the backing layer does not possess reactive functional groups that can interfere with the curing of the silicone composition.

The silicone grips disclosed herein can be used in a wide variety of applications, including hand-held articles, and other articles requiring non-slip surfaces such as flooring (including steps), mats, seats, countertops, vehicle surfaces, the bottom of furniture and appliances, cabinetry, and the like.

Figure 9:
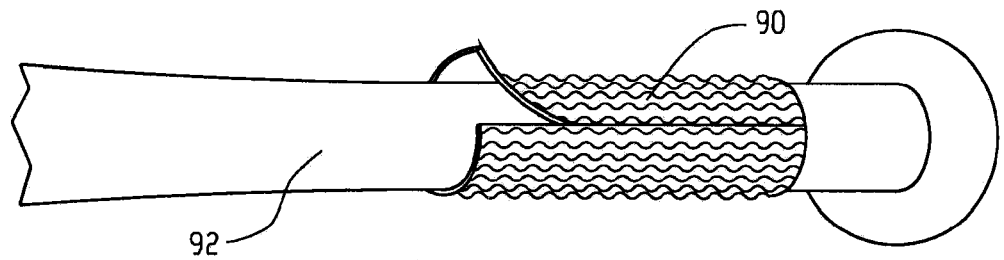
FIG. 9 is a handle of a baseball bat with a multilayer film being applied thereto.
Figure 10:
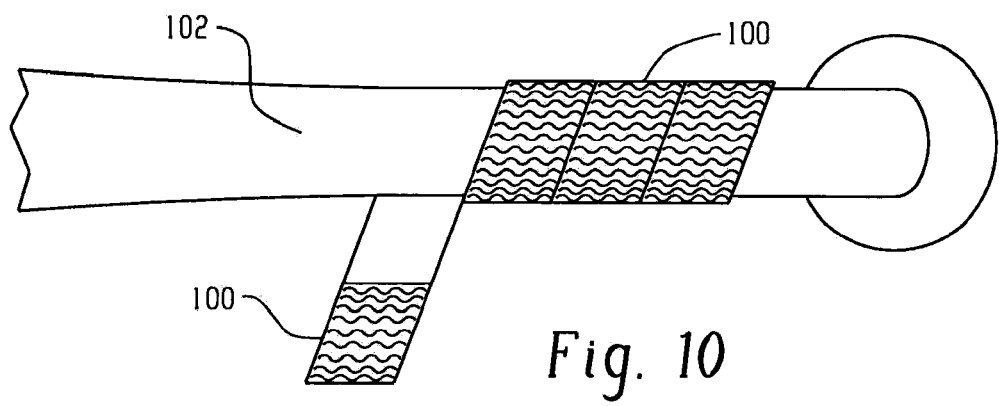
FIG. 10 is a handle of a baseball bat with a multilayer film being applied thereto as a spiral around the bat handle.

In one embodiment, a malleable silicone grip as shown in any of the Figures can be disposed on a contoured surface to provide improved grip. For example, as shown in FIG. 9, a handle 92 of a baseball bat is illustrated with a silicone grip 90 being applied thereto. In this embodiment, the silicone grip 90 improves the friction of the bat handle (e.g., reduces the potential of the bat from slipping from the users grip). Silicone grip 90 in one embodiment is a silicone film layer adhered to the bat handle by an adhesive layer. In another embodiment, the silicone grip comprises a foamed substrate (not shown) disposed between the silicone film layer and the adhesive layer. Use of the foam substrate can reduce shock and/or vibration during the bat's use. Alternatively, as shown in FIG. 10, a tape 100 of the grip can be wound around handle 102.

Other sport-related applications include grips for, e.g., golf clubs, racquets, bike handles, ice picks, lacrosse sticks, field hockey sticks, hockey sticks, ski poles, baseball bats, paddles and racquets (e.g., ping pong, kayaking, canoeing, tennis, badminton, and so forth), gun stocks, rifle sling lining, fishing accessories (e.g., rods and lures), binoculars, athletic gloves (e.g., golf, baseball, football, weight lifting, driving), ball surfaces (e.g., dodge balls, water polo balls, footballs), bottom surface of athletic shoes to facilitate better contact (e.g., soccer cleats, football cleats), hand-pads for weight-lifters, eye-gear (e.g., protective goggles), supplemental padding within helmets, water bottles, skateboard decks, surfboards, jet skis, sleeping bags, golf practice mats, golf cart seats, canoe/kayak seats, flotation devices (e.g. floats for swimming pools), swimming pool area to prevent slippage, and swimming pool linings. The grips can also be used on playground equipment, such as monkey bars, swing seats, slide steps, and so forth. The grips can also be used on boat hulls and rudders, particularly when the exterior surface of the silicone layer includes dimples, which can reduce drag.

Figure 11:
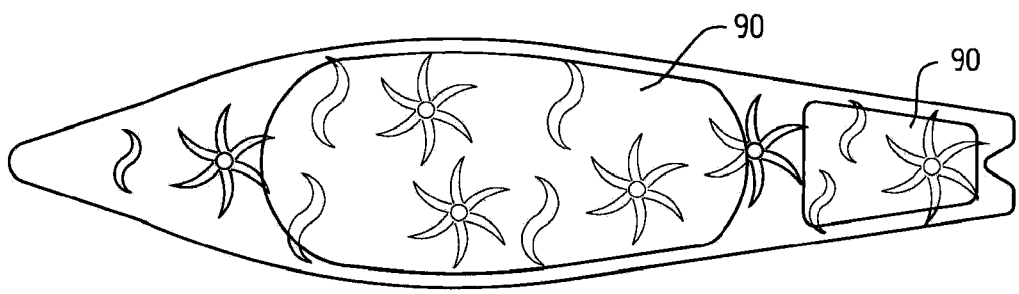
FIG. 11 is an oblique view of surfboard traction pads.

In one specific embodiment, as illustrated in FIG. 11, the silicone grip is used as a surfboard traction pad 90. It has been found that in addition to the malleability (so that the grips can fit the contours of the board) and durability, the silicone film layers provide effective traction even when wet. In another advantageous feature, the grips can be manufactured to be transparent, and therefore do not cover graphics on the board. Alternatively, as described above, the grips can themselves be configured to provide a colored or graphic effect.

Figure 12:
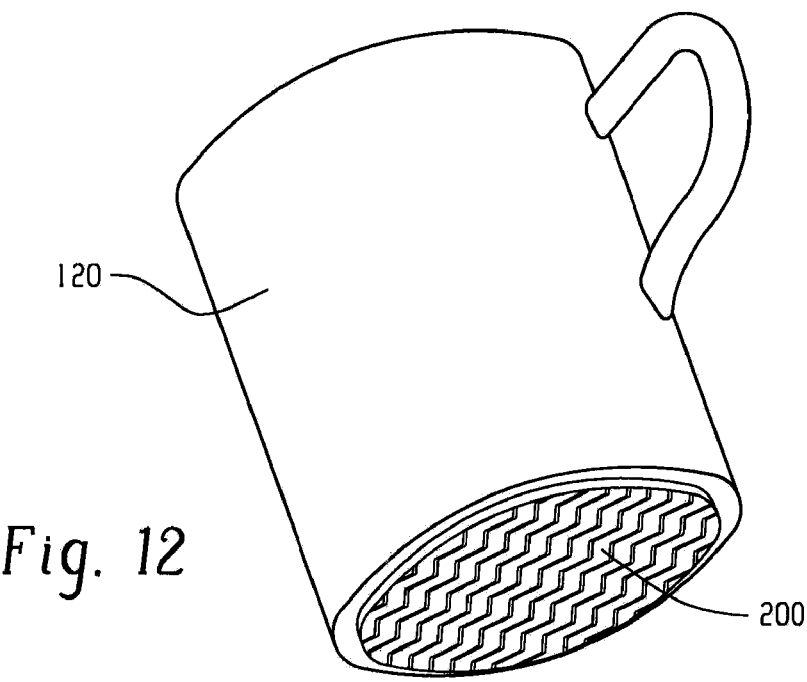
FIG. 12 is an oblique view of a cup with a film disposed thereon.

Exemplary culinary applications include pot and pan handles, utensil handles (e.g., knives), dishware, trivets, placemats, e.g., serving placemats in airplanes or trains, tray liners, flip-down eating trays on airplanes or trains, hot plates, wine racks, cutting board bottoms, kitchen appliances (e.g., the bottom of blenders, toasters, coffee pots, refrigerator handles, and so forth), kitchen tools (e.g., can openers, grip pads for opening jars, oven mitts) and dinnerware, such as cups, mugs, bottles and bottle caps, jar lids, drinking glasses, bowls, plates, serving dishes, baby dishes, and the like. For example, referring to FIG. 12, a cup 120 is illustrated with a silicone grip 200 disposed thereon to reduce the probability of the cup 120 slipping along a surface. In one embodiment, the cup 120 comprises a multilayer film having a foam substrate that is can absorb vibration and therefore reduce the potential of spilling liquid from the cup 120 during vibration.

Figure 13:
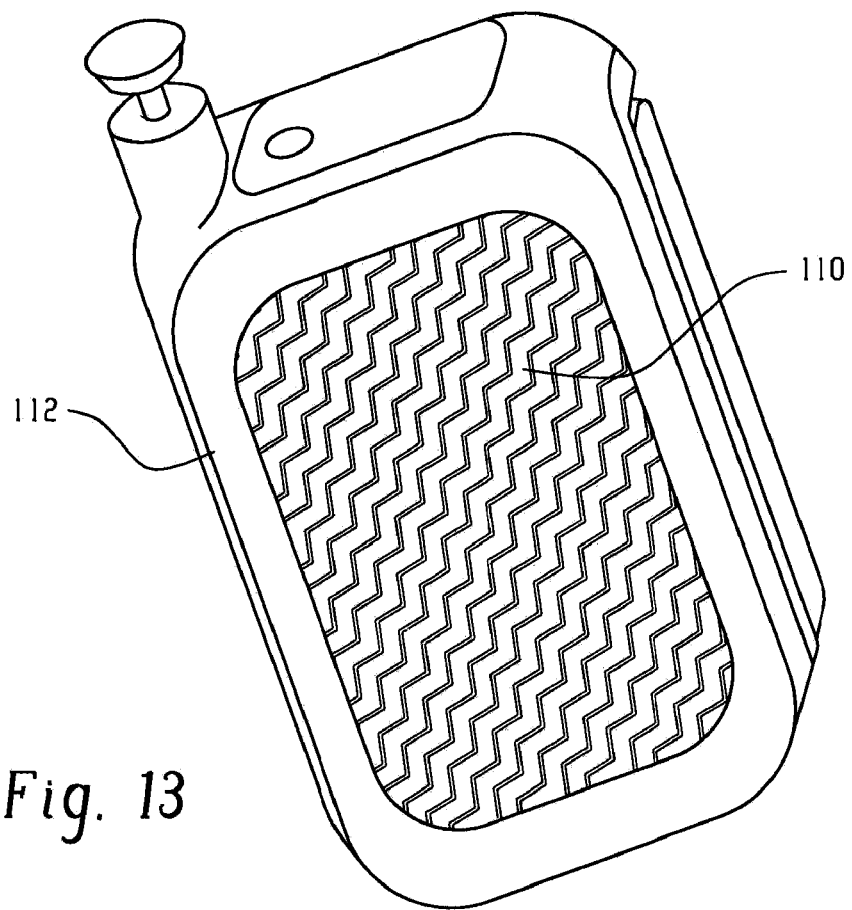
FIG. 13 is an oblique view of a multilayer film comprising a silicone layer having a zig-zag shaped texture applied to a cellular telephone.

Exemplary applications for use in the home or commercial settings include hand tools (e.g., screwdrivers, wrenches, and the like), power tools (e.g., drills), thermometers, hand-held appliances (e.g., writing implements, rulers, flashlights (e.g., with reflective backer) and carrying cases and pouches, pads for handheld electronic devices (such as portable gaming systems, CD players, MP3 players, DVD players, notebook computers, remote controllers, video games and video game controllers, and personal digital assistants), caddies and cradles (e.g., chargers, docking stations), hair dryers, curling irons, electric razors, hair remover (e.g., pet hair remover), cameras (e.g., digital cameras, camcorders), military sensing devices, and the like), grips for electronic accessories (e.g., notebook coolers), cellular telephones and hands-free devices and accessories therefore, such as ear-pieces and headsets, paper handling devices (e.g. printer rollers, other rollers such as for cylinder printing), cabinet door cushions, closet door cushions, shelf liners, drawer liners, door knobs, switches (e.g., light switch, toggle switch), on the bottom of furnishings (e.g., rugs, furniture, and so forth), protection of wood furniture (e.g., bunk beds), anti-slip pads for wet surfaces (e.g., bathtub, bathroom floor), on the bottom of appliances (e.g., lamps, office equipment such as staplers, desk writing pads, hole punches, pencil sharpeners, telephones, desktop computers, computer accessories (e.g., keyboards, monitors, desktop printers, mouse pads and mouse rollers, LCD computer screen protector), facsimile machines, and the like), household surfaces (e.g., kitchen counters, fixturing devices to window-glass), coasters, ashtrays, supports for glass (e.g., table top), on the bottom of decorative items to facilitate adhesion and leveling, (e.g., potted plants, picture frames and picture frame footpads, wall hangings, clocks, Christmas decorations), electrical insulation, conveyer belts, a cover to add sparkle to anything with a light source, colored dots for duplicate keys, trophies, and the like. In one specific embodiment, as shown in FIG. 13, a silicone grip 130 comprises a silicone layer 4 having a zigzag shaped texture that has been applied to a cellular telephone 132. The silicone layer 4 provides the phone with improved grip when in use and improved traction when placed on a surface.

Other uses include railings (e.g., stair railing), flooring (e.g., entry-way into building, double-sided mat, non-slip cushion flooring), runners, stair treads, under carpets, ladder steps, and the like.

Exemplary applications for personal use include clothing (e.g., bra straps or strapless bras, and waistbands), knee and elbow pads, coat hangers, the interior of shoes, the bottom of shoes to prevent'slipping (e.g. boots, slippers, socks, pajamas, gymnastic slippers, dance shoes, shoes for infants learning to walk, hospital socks, elderly shoe pads, sports shoes such as basketball sneakers), shoelaces, heel grips for backless shoes, the top band of socks, luggage handles, nail clippers, razors, hair trimmers, shears, eyeglass nose pads and ear loops, sling or strap linings (e.g., backpack, pocketbooks, straps), brush handles (e.g., make-up brush, hair brush, tooth brush, paint brush), perfume bottles, footpads for mirrors (e.g., vanity mirrors), toothpaste tubes, and the like.

Exemplary automotive applications include contact surfaces (e.g., on the dashboard of a vehicle), the underside of video consoles for portable use, e.g., in automobiles, and so forth. Other transportation applications include uses in recreational vehicles, boats, airplanes and campers such as the grips of steering wheels, stick shifts and cup holders, the underside of dashboard mats, pads for items on the dashboard (e.g., glasses, phones, transponders), car seats and booster seats, sunshades, bumper stickers, boat decking including decking and surfaces (e.g., shelves, countertops) within a boat's cabin, dishware (e.g., nautical dishware, dishware for planes and recreational vehicles, and the like), recreational vehicle flooring and surfaces (e.g., shelves, countertops), aircraft overhead storage, aircraft cockpits, and the like.

Exemplary toy and hobby applications include keyboard keys, guitar picks, drum stick grips, work surface mats, hobby tool handles (e.g., soldering irons), flooring for playrooms (e.g., daycare facilities, children's bedrooms), toy grips, hand held toys (e.g., building blocks), toy wheels (e.g., scratch safe wheels for use on hardwood floors), photography (e.g., locking joint on tripod leg, photo grips, post-it pads for pictures), double-sided hem stick for mending the hem of garments, decorative decals or stickers (e.g., decals, stickers, and wall puzzles for walls, windows, bathroom tiles, shower doors, and the like), bookmarks, paint-roller trays and so forth.

Exemplary outdoor applications include garden tool handles (e.g., rakes, shovels, hoes, and so forth), power tool handles (e.g. lawn mowers, chain saws, snow blowers, and so forth), umbrella handles, and the like.

Medical and patient care applications include grips for walkers, crutches and canes, pads for air-casts, sleeve for compression wrap, handicap rails in lavatories, wheel chair grips, wheel chair armrests, handles, and seats, bathtub traction pads, hospital railings and anti-slip railing covers, antimicrobial uses such as keyboard overlays, doorknobs, faucets, phones, medical instruments, utensils, pens, gloves), surgical instrument tray liners and mats, handheld medical instruments, finger monitoring equipment, respirator and gas masks, geriatric and/or disability assistance equipment, in particular, the seats, arm rests, handgrips, floor-contacting portions, and hand-held portions thereof, toilet seats, prescription bottle caps (e.g., eye drop bottle), pill bottles, mammogram pads, and so forth, posture support (e.g., anti-sliding seat mat, posture wedge).

While the above-detailed applications are thought to be exemplary, the following applications are particularly preferred, and include grips for, e.g., golf clubs, racquets, bike handles, ice picks, ski poles, gun stocks, rifle sling lining, fishing accessories (e.g., rods and lures), binoculars, athletic gloves (e.g., golf, baseball), ball surfaces (e.g., dodge balls, water polo balls, footballs), surface of athletic shoes to facilitate better contact (e.g., soccer cleats, football cleats), eyegear (e.g., protective goggles), supplemental padding within helmets, water bottles, skateboard decks, surfboards, jet skis, sleeping bags, golf practice mats, golf cart seats, canoe/kayak seats, flotation devices (e.g. floats for swimming pools), swimming pool area to prevent slippage and swimming pool lining; on playground equipment, such as monkey bars, swing seats, slide steps, and so forth; on boat hulls and rudders, particularly when the exterior surface of the silicone layer includes dimples, which can reduce drag; surfboard traction pads; pot and pan handles, utensil handles (e.g., knives), dishware, trivets, placemats, e.g., serving placemats in airplanes or trains, tray liners, flip-down eating trays on airplanes or trains, hot plates, wine racks, cutting board bottoms, kitchen appliances (e.g., the bottom of blenders, toasters, coffee pots, refrigerator handles, and so forth), kitchen tools (e.g., can openers, grip pads for opening jars, oven mitts) and dinnerware, such as cups, mugs, bottles and bottle caps, jar lids, drinking glasses, bowls, plates, serving dishes, baby dishes; hand tools (e.g., screwdrivers, wrenches, and the like), power tools (e.g., drills), thermometers, hand-held appliances (e.g., writing implements, rulers, pads for handheld electronic devices (such as DVD players), hair dryers, curling irons, hair remover (e.g., pet hair remover), military sensing devices, and the like), grips for electronic accessories (e.g., notebook coolers), hands-free devices such as ear-pieces and headsets, cabinet door cushions, closet door cushions, shelf liners, drawer liners, door knobs, switches (e.g., light switch, toggle switch), on the bottom of furnishings (e.g., rugs, furniture, and so forth), protection of wood furniture (e.g., bunk beds), anti-slip pads for wet surfaces (e.g., bathtub, bathroom floor), on the bottom of appliances (e.g., lamps, office equipment such as staplers, desk writing pads, hole punches, pencil sharpeners, telephones, computer accessories (e.g., keyboards, desktop printers, mouse pads and mouse rollers, LCD computer screen protector), facsimile machines, and the like), household surfaces (e.g., kitchen counters, fixturing devices to window-glass), coasters, ashtrays, supports for glass (e.g., table top), on the bottom of decorative items to facilitate adhesion and leveling, (e.g., potted plants, picture frames and picture frame footpads, wall hangings, clocks, Christmas decorations), electrical insulation, conveyer belts, a cover to add sparkle to anything with a light source, colored dots for duplicate keys, trophies; railings (e.g., stair railing), flooring (e.g., entry-way into building, double-sided mat, non-slip cushion flooring), runners, stair treads, under carpets, ladder steps, and the like; knee and elbow pads, coat hangers, the interior of shoes, the bottom of shoes to prevent slipping (e.g. boots, slippers, socks, pajamas, gymnastic slippers, dance shoes, shoes for infants learning to walk, elderly shoe pads, sports shoes such as basketball sneakers), shoelaces, heel grips for backless shoes, the top band of socks, luggage handles, nail clippers, razors, eyeglass ear loops, sling or strap linings (e.g., backpack, pocketbooks, straps), brush handles (e.g., make-up brush, hair brush, tooth brush, paint brush), perfume bottles, footpads for mirrors (e.g., vanity mirrors), toothpaste tubes, and the like; contact surfaces (e.g., on the dashboard of a vehicle), the underside of video consoles for portable use, e.g., in automobiles; in recreational vehicles, boats, airplanes and campers such as on the grips of steering wheels, stick shifts and cup holders, the underside of dashboard mats, pads for items on the dashboard (e.g., glasses, phones, transponders), car seats and booster seats, sunshades, bumper stickers, boat decking, including decking and surfaces (e.g., shelves, countertops) within a boat's cabin, dishware (e.g., nautical dishware, dishware for planes and recreational vehicles, and the like), recreational vehicle flooring and surfaces (e.g., shelves, countertops), aircraft overhead storage, aircraft cockpits, and the like; keyboard keys, guitar picks, drum stick grips, work surface mats, hobby tool handles (e.g., soldering irons), flooring for playrooms (e.g., daycare facilities, children's bedrooms), toy grips, hand held toys (e.g., building blocks), toy wheels (e.g., scratch safe wheels for use on hardwood floors), photography (e.g., locking joint on tripod leg, photo grips, post-it pads for pictures), double-sided hem stick for mending the hem of garments, decorative decals or stickers (e.g., decals, stickers, and wall puzzles for walls, windows, bathroom tiles, shower doors, and the like), bookmarks, paint-roller trays and so forth; garden tool handles (e.g., rakes, shovels, hoes, and so forth), power tool handles (e.g. lawn mowers, chain saws, snow blowers, and so forth), umbrella handles, and the like; grips for walkers, crutches and canes, pads for air-casts, handicap rails in lavatories, wheel chair grips, wheel chair armrests, handles, and seats, bathtub traction pads, hospital railings, antimicrobial uses such as keyboard overlays, doorknobs, faucets, phones, utensils, pens, gloves), surgical instrument tray liners and mats, geriatric and/or disability assistance equipment, in particular, the seats, arm rests, handgrips, floor-contacting portions, and hand-held portions thereof, toilet seats, prescription bottle caps (e.g., eye drop bottle), pill bottles, mammogram pads, and so forth, posture support (e.g., posture wedge).

The cured silicone compositions have a number of advantageous properties, in that they are soft, and can be made in thin cross sections in continuous roll form with good thickness tolerance, and provide good grip under a variety of use conditions such as wet, dry, in the presence of particulates such as dust, sand, dirt, or lubricating powders, and the like.

The adhesion between the silicone layer and the backing layer as determined by pull peel strength, can be greater than or equal to about 1,000 grams of force per 25 millimeters (gf/25 mm), specifically greater than or equal to about 1100 gf/25 mm, more specifically greater than or equal to about 1200 gf/25 mm, still more specifically greater than or equal to about 1,250 gf/25 mm, and still more specifically greater than or equal to about 1,300 gf/25 mm, measured in accordance with the pull peel test described in ASTM D903-98.

The adhesion between the silicone layer and a polyester substrate or backing, specifically a polyethylene terephthalate substrate or backing, is greater than or equal to about 1,000 grams of force per 25 millimeters (gf/25 mm), specifically greater than or equal to about 1,100 gf/25 mm, more specifically greater than or equal to about 1,200 gf/25 mm, still more specifically greater than or equal to about 1,250 gf/25 mm, and still more specifically greater than or equal to about 1,300 gf/25 mm, measured in accordance with the pull peel test described in ASTM D903-98.

The cured silicone layers are further durable, in particular abrasion resistant. Abrasion resistance can be determined in accordance with ASTM D4060-01, using an H-18 wheel, a 500-gram load, and 500 cycles. In one embodiment, the silicone layer for use in the grip has a Shore A durometer of about 15, and loses less than about 20 g, less than about 15 g, or less than about 10 g of weight measured in accordance with ASTM D4060-01, using an H-18 wheel, a 500-gram load, and 500 cycles. In another embodiment, the silicone layer for use in the grip has a Shore A durometer of about 30, and loses less than about 30, specifically less than about 20, more specifically less than about 15 g of weight measured in accordance with ASTM D4060-01, using an H-18 wheel, a 500-gram load, and 500 cycles. A sample having a Shore A durometer of 15 with convex dimples lost 5.2 grams of weight under these conditions. A sample having a Shore A durometer of 30 with convex dimples lost 13.8 grams of weight.

Mismatch between coefficients of thermal expansion (CTE) of the silicone layer, the backing layer, a tie layer and/or an adhesive layer, can induce high thermal stress and cause delamination in the final multilayer articles. In various embodiments the adhesive layer can be formulated for applications with multilayer articles comprising said second layer and substrate with different coefficients of thermal expansion (CTE), for example, a high CTE second layer on a low CTE backing layer. In an embodiment, the difference in coefficients of thermal expansion (CTE) between the layers having the highest and lowest CTE, differ by an amount less than or equal to about 15 parts per million per degree centigrade (ppm/° C.), specifically less than or equal to about 10 ppm/° C., more specifically less than or equal to about 5 ppm/° C., and still more specifically less than or equal to about 2 ppm/° C.

The invention is further demonstrated by the following non-limiting examples.

EXAMPLES

The silicone layers were prepared by combining two commercially available two-part organopolysiloxane formulations as described below.

Examples 1-3.

Examples 1-3 were all formulated using a two-part organopolysiloxane formulation available under the trade name LIM 6040-D2, from GE Silicones Pittsfield, Mass., which produces a layer having a Shore A of 40 after cure. Example 1 was formulated by combining 65 wt. % of LIM 6040-D2 and 35 wt. % of a two-part organopolysiloxane formulation available under the trade name LIM 6010 from GE Silicones (which produces a layer having a Shore A of hardness of 30 after cure). Example 2 was formulated by combining 65 wt. % of LIM 6040-D2 with 35 wt. % of a two-part organopolysiloxane formulation available under the trade name 3-4241 Dielectric Tough Gel from Dow Corning (Viscosity=430 cP; Shore OO=60 (after cure)). Example 3 was prepared using 65 wt. % LIM 6040-D2 and 35 wt. % of a two-part organopolysiloxane formulation containing reactive epoxy groups available under the trade name 3-4237 Dielectric Firm Gel from Dow Corning (Viscosity=290 cP; Shore OO=30 after cure).

The components for each example were mixed by hand, then coated onto a roll-over-roll coater between two layers of release liner, and cured between about 100° C. and about 140° C., for example, for about 15 to about 20 minutes. To make solid elastomers and eliminate all air entrapped due to mixing, the reactive composition can be degassed, for example under vacuum.

Adhesion between the cured silicone layer and substrate was measured by peel strength using an Instron fitted with a 50-pound load cell having a 2-, 5-, or 10-pound load range, depending on sample thickness and density. Peel strength was calculated by dividing the force applied at the initiated peel by the thickness of the sample.

Table 1 shows the comparative adhesion of each of the cured silicone layers to different materials. Specifically, qualitative pull-peel adhesion data are given by the designations "good," "moderate," "weak," and "no (adhesion)." Film thicknesses are given in micrometers or mil.

| Backing layer | PET 50 um (2 mil) | PET (Antistatic) 125 um (5 mil) | PET (MELINEX) 75 um (3 mil) | PET 175 um (7 mil) | PI (KAPTON) 125 um (5 mil) | PC 125 um (5 mil) |
|---|---|---|---|---|---|---|
| Ex. 3 | Good | Moderate | Good | Good | Good** | No |
| Ex. 2 | Moderate | Weak | Weak | Weak | No | No |
| Ex. 1 | No | No | No | No | No | No |

**Initial adhesion was good; film adhesion failed after standing.

As seen in the above data, cured silicone layers made from a composition comprising a reactive epoxy group (Example 3, with 3-4237 Dielectric firm Gel) showed improved adhesion performance relative to compositions without epoxy groups, especially on poly(ethylene terephthalate) (PET) films. Example 3 also showed initial good results for adhesion to polyimide (PI) but the film eventually showed adhesion failure after standing. Polycarbonate (PC) showed no adhesion with any of the silicone formulations. Films of Examples 1 and 2 would accordingly be used without a backing layer, or with an adhesive layer between the backing layer and the film.

Example 4-6

The following formulations were tested for peel strength as described above, and are reported in pounds per inch (ppi).

| | Polysiloxane, weight ratio | | Silicone Grip | | |
|---|---|---|---|---|---|
| | LIM 6040 | Gel 3-4237 | Thickness, mil (um) | Hardness, Shore A | Peel strength, ppi |
| Example 4 | 78 | 22 | 32 (813) | 27 | 4.6 |
| Example 5 | 72 | 28 | 31 (787) | 24 | 4.4 |
| Example 6 | 65 | 35 | 30 (762) | 19 | 3.3 |

The above examples show that a range of ratios of the two primary formulation components can be used to produce silicone elastomers with acceptable bond to PET.

Example 7.

Coefficients of friction (CoF) were determined for two Formulations. The data in Tables A and B were determined for a formulation made using 65 wt % of GE Silicones LIM 6040 and 35% of Dow Corning Gel 3-4237. The data in Table C were determined for a formulation made using 65 wt % of GE Silicones LIM 6071 and 35% of Dow Corning Gel 3-4237. The exterior surface of the cured silicone layer was either smooth, or provided with convex dimples as indicated.

A. Coefficient of Friction for Grip Material: Dimpled, Durometer 15 (ASTM D-1894)

| | Substrate Material | | | | | | | | | | | |
|---|---|---|---|---|---|---|---|---|---|---|---|---|
| | SS | | | SS | | | Glass | | | Glass | | |
| | Surface Condition | | | | | | | | | | | |
| | Dry | | | Wet | | | Dry | | | Wet | | |
| Sled Weight, g | 100 | 200 | 400 | 100 | 200 | 400 | 100 | 200 | 400 | 100 | 200 | 400 |
| Static CoF | 7.8 | 8.4 | 6.1 | 9.4 | 7.7 | 5.9 | 11.3 | 9.6 | 8.8 | 12.6 | 8.7 | 9.0 |
| Kinetic CoF | 6.3 | 5.4 | 5.4 | 7.3 | 4.8 | 5.8 | 7.6 | 4.9 | 7.0 | 8.1 | 4.1 | 7.3 |

B. Coefficient of Friction for Grip Material: Smooth, Durometer 15 (ASTM D-1894)

| | Substrate Material | | | | | | | | | | | |
|---|---|---|---|---|---|---|---|---|---|---|---|---|
| | SS | | | SS | | | Glass | | | Glass | | |
| | Surface Condition | | | | | | | | | | | |
| | Dry | | | Wet | | | Dry | | | Wet | | |
| Sled Weight, g | 100 | 200 | 400 | 100 | 200 | 400 | 100 | 200 | 400 | 100 | 200 | 400 |
| Static CoF | 5.1 | 4.5 | 4.2 | 3.8 | 4.1 | 3.8 | 5.2 | 4.5 | 5.4 | 2.9 | 5.0 | 4.1 |
| Kinetic CoF | 3.8 | 3.8 | 3.5 | 5.1 | 3.8 | 4.4 | 3.9 | 4.1 | 4.7 | 4.9 | 4.1 | 4.1 |

C. Coefficient of Friction for Grip Material: Dimpled, Durometer 30 (ASTM D-1894)

| | Substrate Material | | | | | | | | | | | |
|---|---|---|---|---|---|---|---|---|---|---|---|---|
| | SS | | | SS | | | Glass | | | Glass | | |
| | Surface Condition | | | | | | | | | | | |
| | Dry | | | Wet | | | Dry | | | Wet | | |
| Sled Weight, g | 100 | 200 | 400 | 100 | 200 | 400 | 100 | 200 | 400 | 100 | 200 | 400 |
| Static CoF | 9.9 | 8.6 | 8.0 | 11.3 | 7.9 | 7.5 | 10.4 | 10.2 | 8.2 | 10.4 | 10.0 | 8.9 |
| Kinetic CoF | 7.4 | 8.1 | 6.5 | 9.3 | 6.9 | 6.2 | 8.0 | 7.3 | 7.4 | 10.9 | 8.5 | 8.0 |

The films disclosed herein have a number of advantageous properties. They can be applied to provide improved grip, they can give an article a soft texture and feel, they can improve an article's traction, they can be configured in stretchable embodiments or in embodiments that resist stretching, and can be produced with a variety of visual and optical appearances. Further, the films can be made in thin cross sections in continuous roll form with good thickness tolerance, and provide good grip under a variety of use conditions such as wet, dry, in the presence of particulates such as dust, sand, dirt, or lubricating powders, and the like.

Unless defined otherwise herein, technical and scientific terms used herein have the same meaning as is commonly understood by one of skill in the art to which this invention belongs. The terms "first," "second," and "the like," as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive of the endpoint and independently combinable. The modifier "about" used in connection with a quantity is inclusive of the stated value and has the meaning dictated by the context (e.g., includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A silicone grip, comprising
a cured silicone layer with a Shore A Durometer of less than or equal to about 60 and having an exterior surface and an opposite, interior surface; and
a first adhesive layer disposed on and in contact with the interior surface,
wherein the silicone layer is formed from a curable silicone composition comprising
a catalyst that promotes cure of the silicone composition,
a higher molecular weight organopolysiloxane having at least two alkenyl groups per molecule,
a lower molecular weight organopolysiloxane having at least two alkenyl groups per molecule, and
an organopolysiloxane having at least two silicon-bonded hydrogen atoms per molecule,
wherein reaction of the higher molecular weight organopolysiloxane having at least two alkenyl groups per molecule with the organopolysiloxane having at least two silicon-bonded hydrogen atoms per molecule produces a cured silicone having a Shore A Durometer of 30 to 60, and wherein reaction of the lower molecular weight organopolysiloxane having at least two alkenyl groups per molecule with the organopolysiloxane having at least two silicon-bonded hydrogen atoms per molecule produces a cured silicone having a Shore OO Durometer of 20 to 60.

2. The grip of claim 1, wherein the organopolysiloxane having at least two silicon-bonded hydrogen atoms per molecule comprises a first organopolysiloxane having at least two silicon-bonded hydrogen atoms per molecule and a second organopolysiloxane having at least two silicon-bonded hydrogen atoms per molecule, and further wherein reaction of the higher molecular weight organopolysiloxane having at least two alkenyl groups per molecule with the first organopolysiloxane having at least two silicon-bonded hydrogen atoms per molecule produces a cured silicone having a Shore A Durometer of 30 to 60, and reaction of the lower molecular weight organopolysiloxane having at least two alkenyl groups per molecule with the second organopolysiloxane having at least two silicon-bonded hydrogen atoms per molecule produces a cured silicone having a Shore OO Durometer of 20 to 60.

3. The grip of claim 1, wherein the curable silicone composition, exclusive of any filler, further comprises about 0.05 to about 50 wt % of an organosilane containing a reactive group.

4. The grip of claim 3, wherein the reactive group is an epoxy group.

5. The grip of claim 3, wherein the reactive organosilane is glycidoxypropyl tri($C_{1-3}$alkoxy)silane, glycidoxypropyl di($C_{1-3}$alkoxy)($C_{1-3}$alkyl)silane, 2,3-epoxycyclohexyl-4-ethyl tri($C_{1-3}$alkoxy)silane, 2,3-epoxycyclohexyl-4-ethoxyethyl di($C_{1-3}$alkoxy)($C_{1-3}$alkyl)silane, or a combination comprising at least one of the foregoing alkoxysilane monomers.

6. The grip of claim 1, further comprising a silicone fluid.

7. The grip of claim 6, wherein the silicone fluid co-cures with curable silicone composition.

8. The grip of claim 1, wherein the high molecular weight and low molecular weight organopolysiloxanes having at least two alkenyl groups per molecule have the formula:

$$M_a D_b T_c Q_d,$$

wherein
the subscripts a, b, c, and d are zero or a positive integer, subject to the limitation that if subscripts a and b are both equal to zero, subscript c is greater than or equal to two;
M has the formula $R_3SiO_{1/2}$;
D has the formula $R_2SiO_{2/2}$;
T has the formula $RSiO_{3/2}$; and
Q has the formula $SiO_{4/2}$, wherein each R group independently represents hydrogen, alkenyl groups, substituted and unsubstituted monovalent hydrocarbon groups having from one to forty carbon atoms each, subject to the limitation that at least two of the R groups are alkenyl groups; and wherein
the organopolysiloxane having at least two silicon-bonded hydrogen atoms per molecule is generally represented by the formula:

$$M'_a D'_b T'_c Q'_d,$$

wherein
the subscripts a, b, c, and d are zero or a positive integer, subject to the limitation that if subscripts a and b are both equal to zero, subscript c is greater than or equal to two;
M' has the formula $R_3SiO_{1/2}$;
D' has the formula $R_2SiO_{2/2}$;
T' has the formula $RSiO_{3/2}$; and
Q' has the formula $SiO_{4/2}$, wherein each R group independently represents hydrogen, substituted and unsubstituted monovalent hydrocarbon groups having from one to forty carbon atoms each, subject to the limitation that at least two of the R groups are hydrogen; and wherein the reactive organosiloxane is represented by the formula:

$$M''_a D''_b T''_c Q''_d,$$

wherein
the subscripts a, b, c, and d are zero or a positive integer, subject to the limitation that if subscripts a and b are both equal to zero, subscript c is greater than or equal to two;
M'' has the formula $R_3SiO_{1/2}$;
D'' has the formula $R_2SiO_{2/2}$;
T'' has the formula $RSiO_{3/2}$; and
Q'' has the formula $SiO_{4/2}$,
wherein each R group independently represents hydrogen, alkenyl groups, substituted and unsubstituted monovalent hydrocarbon groups having from one to forty carbon atoms each, subject to the limitation that, in addition to any alkenyl groups and/or reactive hydride groups present in the silicone, one or more of the R groups is a reactive organic group, wherein the reactive organic group comprises an epoxy group, an acrylate group, a methacrylate group, or a combination comprising at least one of the foregoing groups.

9. The grip of claim 1, wherein the exterior surface of the cured silicone layer is smooth.

10. The grip of claim 1, wherein the exterior surface of the cured silicone layer has an average roughness value that is less than or equal to about 1.22 micrometers as measured by ISO-1302-2002.

11. The grip of claim 1, wherein the exterior surface of the cured silicone layer is textured.

12. The grip of claim 11, wherein the exterior, textured surface comprises bumps, depressions, striations, crosshatches, wavy lines, random structures, parallel structures, tessellations, fish scales in an aligned or unaligned pattern, a stonework texture, or a combination comprising at least one of the foregoing textures.

13. The grip of claim 1, wherein the cured silicone layer and/or the first adhesive comprises an antimicrobial and/or an antiviral additive.

14. The grip of claim 1, wherein the grip is substantially transparent.

15. The grip of claim 1, wherein the grip is conformable to an irregular surface.

16. The grip of claim 1, wherein the exterior surface of the cured silicone layer is smooth, and has a static coefficient of friction on dry glass of greater than or equal to about 5, and/or a kinetic coefficient of friction on dry glass of greater than or equal to about 3.5, each determined in accordance with ASTM D 1894-01, using a sled weight of about 100 grams.

17. The grip of claim 1, wherein the exterior surface of the cured silicone layer is a convexly dimpled convex surface having a static coefficient of friction on dry glass of greater than or equal to about 11, and/or a kinetic coefficient of friction on dry glass of greater than or equal to about 7.5 determined in accordance with ASTM D 1894-01, using a sled weight of about 100 grams.

18. The grip of claim 1, wherein the silicone layer has a Shore A Durometer of about 15, and loses less than about 20 g of weight measured in accordance with ASTM D4060-01, using an H-18 wheel, a 500-gram load, and 500 cycles.

19. The grip of claim 1, wherein the silicone layer has a Shore A Durometer of about 30, and loses less than about 20 g of weight measured in accordance with ASTM D4060-01, using an H-18 wheel, a 500-gram load, and 500 cycles.

20. An article, wherein the silicone grip of claim 1 is adhered to a surface of the article via the first adhesive layer.

21. A method of manufacture of the silicon grip of claim 1, comprising contacting the cured silicone film layer with the adhesive layer.

22. The method of claim 1, further comprising contacting a surface of the curable silicone composition with a texturing surface before curing, during curing, or after partially curing to provide the exterior surface of the cured silicone layer with a texture.

23. The grip of claim 1, further comprising a backing layer having a first side and a second side, and a second adhesive layer, wherein the first side of the backing layer is disposed on and in contact with a side of the first adhesive layer opposite the cured silicone layer; and the second adhesive layer is disposed on and in contact with the second side of the backing layer.

24. An article, wherein the silicone grip of claim 23 is adhered to a surface of the article via the second adhesive layer.

25. A silicone grip, comprising
a cured silicone layer with a Shore A Durometer of less than or equal to about 60 and having an exterior surface and an opposite, interior surface; and
a backing layer disposed on and in contact with the interior surface,
wherein the silicone layer is formed from a curable silicone composition comprising
a catalyst that promotes cure of the silicone composition,
a higher molecular weight organopolysiloxane having at least two alkenyl groups per molecule,
a lower molecular weight organopolysiloxane having at least two alkenyl groups per molecule, and
an organopolysiloxane having at least two silicon-bonded hydrogen atoms per molecule,
wherein reaction of the higher molecular weight organopolysiloxane having at least two alkenyl groups per molecule with the organopolysiloxane having at least two silicon-bonded hydrogen atoms per molecule produces a cured silicone having a Shore A Durometer of 30 to 60, and wherein reaction of the lower molecular weight organopolysiloxane having at least two alkenyl groups per molecule with the organopolysiloxane having at least two silicon-bonded hydrogen atoms per molecule produces a cured silicone having a Shore OO Durometer of 20 to 60
and further wherein the peel strength between the backing layer and the cured silicone layer is greater than or equal to about 1,000 grams of force per 25 millimeters, measured according to ASTM D903-98.

26. The grip of claim 25, wherein the organopolysiloxane having at least two silicon-bonded hydrogen atoms per molecule comprises a first organopolysiloxane having at least two silicon-bonded hydrogen atoms per molecule and a second organopolysiloxane having at least two silicon-bonded hydrogen atoms per molecule, and further wherein reaction of the higher molecular weight organopolysiloxane having at least two alkenyl groups per molecule with the first organopolysiloxane having at least two silicon-bonded hydrogen atoms per molecule produces a cured silicone having a Shore A Durometer of 30 to 60, and reaction of the lower molecular weight organopolysiloxane having at least two alkenyl groups per molecule with the second organopolysiloxane having at least two silicon-bonded hydrogen atoms per molecule produces a cured silicone having a Shore OO Durometer of 20 to 60.

27. The grip of claim 25, wherein the backing comprises a polyester, a polyurethane, polycarbonate, polyamide, polyolefin, polystyrene, poly(phenylene oxide), nylon, polyvinylchloride, polyimide, polyetherimide, polyacetal, or a combination comprising at least one of the foregoing polymers.

28. The grip of claim 25, wherein the backing layer comprises a foam having a density of less than about 65 pounds per cubic foot.

29. The grip of claim 25, wherein the backing layer comprises a foam having a density of less than about 50 pounds per cubic foot.

30. The grip of claim 25, wherein the grip is transparent.

31. The grip of claim 25, wherein the backing layer comprises a graphic indicia, and the silicone layer is transparent.

32. The grip of claim 25, wherein the exterior surface of the cured silicone layer is smooth, and has a static coefficient of friction on dry glass of greater than or equal to about 5, and/or a kinetic coefficient of friction on dry glass of greater than or equal to about 3.5, each determined in accordance with ASTM D 1894-01, using a sled weight of about 100 grams.

33. The grip of claim 25, wherein the silicone layer has a Shore A Durometer of about 15, and loses less than about 20 g of weight measured in accordance with ASTM D4060-01, using an H-18 wheel, a 500-gram load, and 500 cycles.

34. The grip of claim 25, wherein the silicone layer has a Shore A Durometer of about 30, and loses less than about 20 g of weight measured in accordance with ASTM D4060-0 1, using an H-18 wheel, a 500-gram load, and 500 cycles.

35. The grip of claim 25, wherein the exterior surface of the cured silicone layer is a convexly dimpled convex surface having a static coefficient of friction on dry glass of greater than or equal to about 11, and/or a kinetic coefficient of friction on dry glass of greater than or equal to about 7.5 determined in accordance with ASTM D 1894-01, using a sled weight of about 100 grams.

36. A method of manufacture of the grip of claim 25, comprising contacting the backing layer with the curable silicone composition; and curing the curable silicone composition.

37. The method of claim 36, further comprising contacting a surface of the curable silicone composition with a texturing surface before curing, during curing, or after partially curing to provide the exterior surface of the cured silicone layer with a texture.

38. The method of claim 36, wherein the curable silicone composition is cast onto a release layer prior to contacting with the backing layer.

39. The method of claim 38, wherein the layer of the curable silicone composition is uncured or partially cured after casting and before contacting with the backing layer.

40. The method of claim 38, wherein the release layer is textured.

41. An article, wherein the grip of claim 25 is adhered to a surface of the article via an adhesive layer.

42. The article of claim 41, wherein the backing layer is a foam having a density of less than about 65 pounds per cubic foot.

43. The grip of claim 25, further comprising an adhesive layer disposed on and in contact with the backing layer on a side opposite the silicone layer.

44. The grip of claim 43, wherein the backing layer is a foam having a density of less than about 65 pounds per cubic foot.

45. The grip of claim 43, wherein the grip is substantially transparent.

46. The grip of claim 43, wherein the backing layer comprises a graphic indicia, and the silicone layer and adhesive layer are substantially transparent.

47. An article, wherein the grip of claim 43 is adhered to a surface of the article via the adhesive layer.

48. The article of claim 47, wherein the backing layer is a foam having a density of less than about 65 pounds per cubic foot.

* * * * *

UNITED STATES PATENT AND TRADEMARK OFFICE
CERTIFICATE OF CORRECTION

| | | |
|---|---|---|
| PATENT NO. | : 7,625,625 B2 | Page 1 of 1 |
| APPLICATION NO. | : 11/497809 | |
| DATED | : December 1, 2009 | |
| INVENTOR(S) | : Rios et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 323 days.

Signed and Sealed this

Second Day of November, 2010

David J. Kappos
*Director of the United States Patent and Trademark Office*